United States Patent
Hillel et al.

(10) Patent No.: US 11,525,788 B2
(45) Date of Patent: Dec. 13, 2022

(54) COMPUTER-IMPLEMENTED METHODS FOR DETERMINING COMPRESSOR OPERABILITY

(71) Applicant: ROLLS-ROYCE plc, London (GB)

(72) Inventors: Malcolm L Hillel, Derby (GB); Bryce D Conduit, Derby (GB); Anthony M Dickens, Cambridge (GB); James V Taylor, Cambridge (GB); Robert J Miller, Cambridge (GB); Christopher R Hall, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/897,889

(22) Filed: Jun. 10, 2020

(65) Prior Publication Data
US 2020/0393385 A1 Dec. 17, 2020

(30) Foreign Application Priority Data
Jun. 13, 2019 (GB) ...................................... 1908496

(51) Int. Cl.
*G01N 21/95* (2006.01)
(52) U.S. Cl.
CPC .................................... *G01N 21/95* (2013.01)
(58) Field of Classification Search
None
See application file for complete search history.

(56) References Cited

U.S. PATENT DOCUMENTS

| | | | |
|---|---|---|---|
| 6,231,306 B1 * | 5/2001 | Khalid | F04D 27/0284 416/26 |
| 6,301,572 B1 | 10/2001 | Harrison | |
| 6,474,935 B1 * | 11/2002 | Crotty | F04D 27/001 415/118 |
| 7,181,959 B2 | 2/2007 | Matsumoto et al. | |
| 2004/0123600 A1 | 7/2004 | Brunell et al. | |
| 2010/0262401 A1 * | 10/2010 | Pfeifer | F04D 27/001 702/182 |
| 2011/0247418 A1 | 10/2011 | Hoyte et al. | |
| 2013/0111915 A1 | 5/2013 | Schwarz et al. | |
| 2013/0113915 A1 | 5/2013 | Scheid et al. | |

(Continued)

FOREIGN PATENT DOCUMENTS

| CN | 101881269 B | 11/2015 |
|---|---|---|
| CN | 106248368 A | 12/2016 |

(Continued)

OTHER PUBLICATIONS

Machine translation of EP0516534A1 (Pourchot Thierry) (Year: 1992).*

(Continued)

*Primary Examiner* — Matthew G Marini
(74) *Attorney, Agent, or Firm* — Oliff PLC

(57) ABSTRACT

A computer-implemented method comprising: controlling input of data quantifying damage received by a compressor of a gas turbine engine into a first machine learning algorithm; receiving data quantifying a first operating parameter of the compressor as an output of the first machine learning algorithm; and determining operability of the compressor by comparing the received data quantifying the first operating parameter of the compressor with a threshold.

13 Claims, 13 Drawing Sheets

(56) References Cited

U.S. PATENT DOCUMENTS

| | | | |
|---|---|---|---|
| 2013/0318018 A1 | 11/2013 | Kalya et al. | |
| 2015/0241304 A1 | 8/2015 | Brummel et al. | |
| 2016/0123232 A1 | 5/2016 | Wright et al. | |
| 2016/0314692 A1* | 10/2016 | Bahrami | G08G 5/0013 |
| 2017/0022907 A1 | 1/2017 | Argote et al. | |
| 2017/0298836 A1 | 10/2017 | Tiwari et al. | |
| 2017/0356346 A1 | 12/2017 | Jiang et al. | |
| 2018/0165384 A1* | 6/2018 | Gandhi | G05B 23/0254 |
| 2018/0283200 A1* | 10/2018 | Gill | G01M 15/14 |
| 2018/0347408 A1 | 12/2018 | Collins et al. | |
| 2018/0371914 A1 | 12/2018 | Karigiannis et al. | |
| 2019/0032508 A1* | 1/2019 | Wang | H04N 5/332 |
| 2019/0086291 A1* | 3/2019 | Frewen | G06Q 10/20 |
| 2019/0251402 A1* | 8/2019 | Godwin, IV | G06N 3/0454 |

FOREIGN PATENT DOCUMENTS

| | | | |
|---|---|---|---|
| CN | 108776730 A | | 11/2018 |
| CN | 109460621 A | | 3/2019 |
| EP | 0516534 A1 | * | 12/1992 |
| EP | 1 418 312 A2 | | 5/2004 |
| EP | 2 053 475 A1 | | 4/2009 |
| EP | 2 589 782 A2 | | 5/2013 |
| EP | 3 422 126 A1 | | 1/2019 |
| JP | 4208497 B2 | | 1/2009 |
| WO | 98/26336 A1 | | 6/1998 |
| WO | 2017/162434 A1 | | 9/2017 |

OTHER PUBLICATIONS

Nov. 10, 2020 extend European Search Report issued in Patent Application No. 20178984.9.
Nov. 10, 2020 extend European Search Report issued in Patent Application No. 20178983.1.
Nov. 9, 2020 extend European Search Report issued in Patent Application No. 20178986.4.
Dec. 13, 2019 Search Report issued in Great Britain Application No. 1908496.1.
Dec. 13, 2019 Search Report issued in Great Britain Application No. 1908494.6.
Nov. 20, 2019 Search Report issued in Great Britain Application No. 1908497.9.
U.S. Appl. No. 16/897,903, filed Jun. 10, 2020 in the name of Hall et al.
U.S. Appl. No. 16/897,919, filed Jun. 10, 2020 in the name of Hall et al.
Jun. 28, 2022 Office Action issued in U.S. Appl. No. 16/897,919.

* cited by examiner

COMPUTER-IMPLEMENTED METHODS FOR DETERMINING COMPRESSOR OPERABILITY

CROSS-REFERENCE TO RELATED APPLICATIONS

This specification is based upon and claims the benefit of priority from UK Patent Application Number 1908496.1 filed on 13 Jun. 2019, the entire contents of which are incorporated herein by reference.

TECHNOLOGICAL FIELD

The present disclosure concerns computer-implemented methods for determining compressor operability.

BACKGROUND

During operation, gas turbine engines may ingest objects (for example, a bird or debris on a runway) which may cause damage to a fan and/or one or more compressor stages of the gas turbine engine. For example, ingested objects may impact the forward stages of the low pressure compressor and cause the low pressure compressor blades to crack. Additionally, cracks may form in the compressor blades over a number of operating cycles due to fatigue. Furthermore, turbine blades may become damaged over a period of time due to the high temperatures and stresses that they experience in operation.

Cracks in compressor blades are usually identified during inspections of the gas turbine engine and the affected compressor blades may be machined (for example, 'boroblended') to remove the blade material which includes the cracks that were found during engine inspection. An accurate prediction of the impact of blade damage on operability may need to be made quickly in order to sentence the affected components and minimise disruption. Inaccurate predictions may result in components being condemned unnecessarily and thus incurring significant cost penalties. This expense is compounded by the increasing use of bladed disks. Now, instead of being able to replace individual damaged blades, the entire bladed disk must be scrapped or subjected to a complex repair.

Computational fluid dynamic (CFD) techniques may be used to model the effect of damage on compressor operability. However, CFD techniques are usually time consuming, labour intensive and not sufficiently accurate. The damaged geometry must be measured, gridded, solved and analysed, and this process currently takes days of an expert's time. The prediction of the stall point also relies upon accurate modelling of large separations caused by the blunt blades; this is beyond current industry CFD methods.

BRIEF SUMMARY

According to the disclosure there is provided a computer-implemented method comprising: controlling input of at least a portion of a first training data set into a first machine learning algorithm, the first training data set including: data quantifying damage to a first rotor; and data quantifying a first operating parameter of the first rotor; receiving data quantifying the first operating parameter as an output of the first machine learning algorithm; and training the first machine learning algorithm using: the received data output from the first machine learning algorithm; and data quantifying the first operating parameter of the first rotor, the trained first machine learning algorithm being configured to enable determination of operability of a second rotor.

According to a first aspect there is provided a computer-implemented method comprising: controlling input of at least a portion of a first training data set into a first machine learning algorithm, the first training data set including: data quantifying damage to a first compressor; and data quantifying a first operating parameter of the first compressor; receiving data quantifying the first operating parameter as an output of the first machine learning algorithm; and training the first machine learning algorithm using: the received data output from the first machine learning algorithm; and data quantifying the first operating parameter of the first compressor, the trained first machine learning algorithm being configured to enable determination of operability of a second compressor of a gas turbine engine.

The computer-implemented method may further comprise: receiving data quantifying damage received by one or more compressor blades of the first compressor; and generating the data quantifying damage received by the first compressor using the received data quantifying damage received by one or more compressor blades, and a damage parameter.

Generating the data quantifying damage received by the first compressor may comprise convoluting the received data quantifying damage received by one or more compressor blades of the first compressor with the damage parameter.

The damage parameter may be an amount of damage to a portion of the first compressor.

The damage parameter may be one or more separations between portions of the first compressor.

The damage parameter may be a gradient of damage across at least a portion of the first compressor.

The damage parameter may be a number of damaged portions of the first compressor.

Generating the data quantifying damage received by the first compressor may comprise using the received data quantifying damage received by one or more compressor blades, and a plurality of damage parameters.

Generating the data quantifying damage received by the first compressor may comprise convoluting the received data quantifying damage received by one or more compressor blades of the first compressor with each damage parameter of the plurality of damage parameters.

The computer-implemented method may further comprise: determining importance of at least a subset of the plurality of damage parameters; and where a first damage parameter has an importance that does not meet a predetermined criterion, re-generating the data quantifying damage received by the first compressor without using the first damage parameter.

Generating the data quantifying damage received by the first compressor may comprise providing the received data quantifying damage received by one or more compressor blades of the first compressor as an input to an algorithm.

The algorithm may comprise one or more Fourier-related transforms.

The one or more Fourier-related transforms may comprise a Hadamard transform.

Training the first machine learning algorithm may comprise performing optimization using: the received data output from the first machine learning algorithm; and data quantifying the first operating parameter of the first compressor.

The block of performing optimization may include performing stochastic optimization.

The first machine learning algorithm may be a first artificial neural network. Training the first machine learning algorithm may include generating a plurality of first artificial neural networks each having a different number of neurons, and performing cross validation to select the first artificial neural network having the lowest error.

The computer-implemented method may further comprise controlling input of at least a portion of a second training data set into a second machine learning algorithm, the second training data set including: data quantifying damage to a first compressor; and data quantifying a second operating parameter of the first compressor; receiving data quantifying the second operating parameter of the first compressor as an output of the second machine learning algorithm; and training the second machine learning algorithm using: the received data output from the second machine learning algorithm; and data quantifying the second operating parameter of the first compressor, the trained second machine learning algorithm configured to enable determination of operability of the second compressor of the gas turbine engine.

The first operating parameter may be stalling throttle coefficient and the second operating parameter may be pressure rise characteristic.

According to a second aspect there is provided a computer program that, when read by a computer, causes performance of the computer-implemented method as described in the preceding paragraphs of the brief summary for the first aspect.

According to a third aspect there is provided a non-transitory computer readable storage medium comprising computer readable instructions that, when read by a computer, cause performance of the computer-implemented method as described in the preceding paragraphs of the brief summary for the first aspect.

According to a fourth aspect there is provided an apparatus comprising: a controller configured to perform the computer-implemented method as described in the preceding paragraphs of the brief summary for the first aspect.

According to the disclosure there is provided a computer-implemented method comprising: controlling input of data quantifying damage received by one or more components of a gas turbine engine into a first machine learning algorithm; receiving data quantifying a first operating parameter of the gas turbine engine as an output of the first machine learning algorithm; and determining operability of the gas turbine engine by comparing the received data quantifying the first operating parameter of the gas turbine engine with a threshold.

According to the disclosure there is also provided a computer-implemented method comprising: controlling input of data quantifying damage received by a rotor into a first machine learning algorithm; receiving data quantifying a first operating parameter of the rotor as an output of the first machine learning algorithm; and determining operability of the rotor by comparing the received data quantifying the first operating parameter of the rotor with a threshold.

According to a fifth aspect there is provided a computer-implemented method comprising: controlling input of data quantifying damage received by a compressor of a gas turbine engine into a first machine learning algorithm; receiving data quantifying a first operating parameter of the compressor as an output of the first machine learning algorithm; and determining operability of the compressor by comparing the received data quantifying the first operating parameter of the compressor with a threshold.

The computer-implemented method may further comprise: receiving data quantifying damage received by one or more compressor blades of the compressor; and generating the data quantifying damage received by the compressor using the received data quantifying damage received by one or more compressor blades, and a damage parameter.

The block of receiving data quantifying damage received by one or more compressor blades of the compressor may comprise: receiving image data of the compressor; and determining damage received by one or more compressor blades of the compressor using the received image data.

Generating the data quantifying damage received by the compressor may comprise convoluting the received data quantifying damage received by one or more compressor blades of the compressor with the damage parameter.

The damage parameter may be an amount of damage to a portion of the first compressor.

The damage parameter may be one or more separations between portions of the first compressor.

The damage parameter may be a gradient of damage across at least a portion of the first compressor.

The damage parameter may be a number of damaged portions of the first compressor.

Generating the data quantifying damage received by the compressor may comprise using the received data quantifying damage received by one or more compressor blades, and a plurality of damage parameters.

Generating the data quantifying damage received by the compressor may comprise convoluting the received data quantifying damage received by one or more compressor blades of the compressor with each damage parameter of the plurality of damage parameters.

Generating the data quantifying damage received by the compressor may comprise providing the received data quantifying damage received by one or more compressor blades of the compressor as an input to an algorithm.

The algorithm may comprise one or more Fourier-related transforms.

The one or more Fourier-related transforms may comprise a Hadamard transform.

The computer-implemented method may further comprise: controlling input of data quantifying damage received by a compressor of a gas turbine engine into a second machine learning algorithm; receiving data quantifying a second operating parameter of the compressor as an output of the second machine learning algorithm; and determining operability of the compressor by comparing the received data quantifying the second operating parameter of the compressor with a threshold.

The first operating parameter may be stalling throttle coefficient and the second operating parameter may be pressure rise characteristic.

According to a sixth aspect there is provided a computer program that, when read by a computer, causes performance of the computer-implemented method as described in any of the preceding paragraphs of the brief summary for the fifth aspect.

According to a seventh aspect there is provided a non-transitory computer readable storage medium comprising computer readable instructions that, when read by a computer, cause performance of the computer-implemented method as described in any of the preceding paragraphs of the brief summary for the fifth aspect.

According to an eighth aspect there is provided an apparatus comprising: a controller configured to perform the computer-implemented method as described in any of the preceding paragraphs of the brief summary for the fifth aspect.

According to the disclosure there is provided a computer-implemented method comprising: receiving an operability determination for a rotor, the operability determination being determined using an output from a machine learning algorithm trained using data quantifying damage received by rotor blades of a rotor; determining one or more actions to be performed using the received operability determination; and generating control data using the determined one or more actions.

According to a ninth aspect there is provided a computer-implemented method comprising: receiving an operability determination for a compressor of a gas turbine engine, the operability determination being determined using an output from a machine learning algorithm trained using data quantifying damage received by compressor blades of a compressor; determining one or more actions to be performed using the received operability determination; and generating control data using the determined one or more actions.

The computer-implemented method may further comprise controlling a component of the gas turbine engine using the generated control data.

The computer-implemented method may further comprise: controlling storage of the control data in a memory to update one or more gas turbine engine operational parameters.

The control data may define a maximum rate of fuel deliverable to a combustor of the gas turbine engine.

The control data may define an operational state of one or more bleed valves of the compressor.

The control data may define an orientation for one or more stators of the compressor.

The control data may define machining instructions for execution by a robotic repair tool.

The computer-implemented method may further comprise selecting a repair scheme for the compressor using the received operability determination.

According to a tenth aspect there is a computer program that, when read by a computer, causes performance of the computer-implemented method as described in any of the preceding paragraphs of the brief summary for the ninth aspect.

According to an eleventh aspect there is provided a non-transitory computer readable storage medium comprising computer readable instructions that, when read by a computer, cause performance of the computer-implemented method as described in any of the preceding paragraphs of the brief summary for the ninth aspect.

According to a twelfth aspect there is provided an apparatus comprising: a controller configured to perform the computer-implemented method as described in any of the preceding paragraphs of the brief summary for the ninth aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
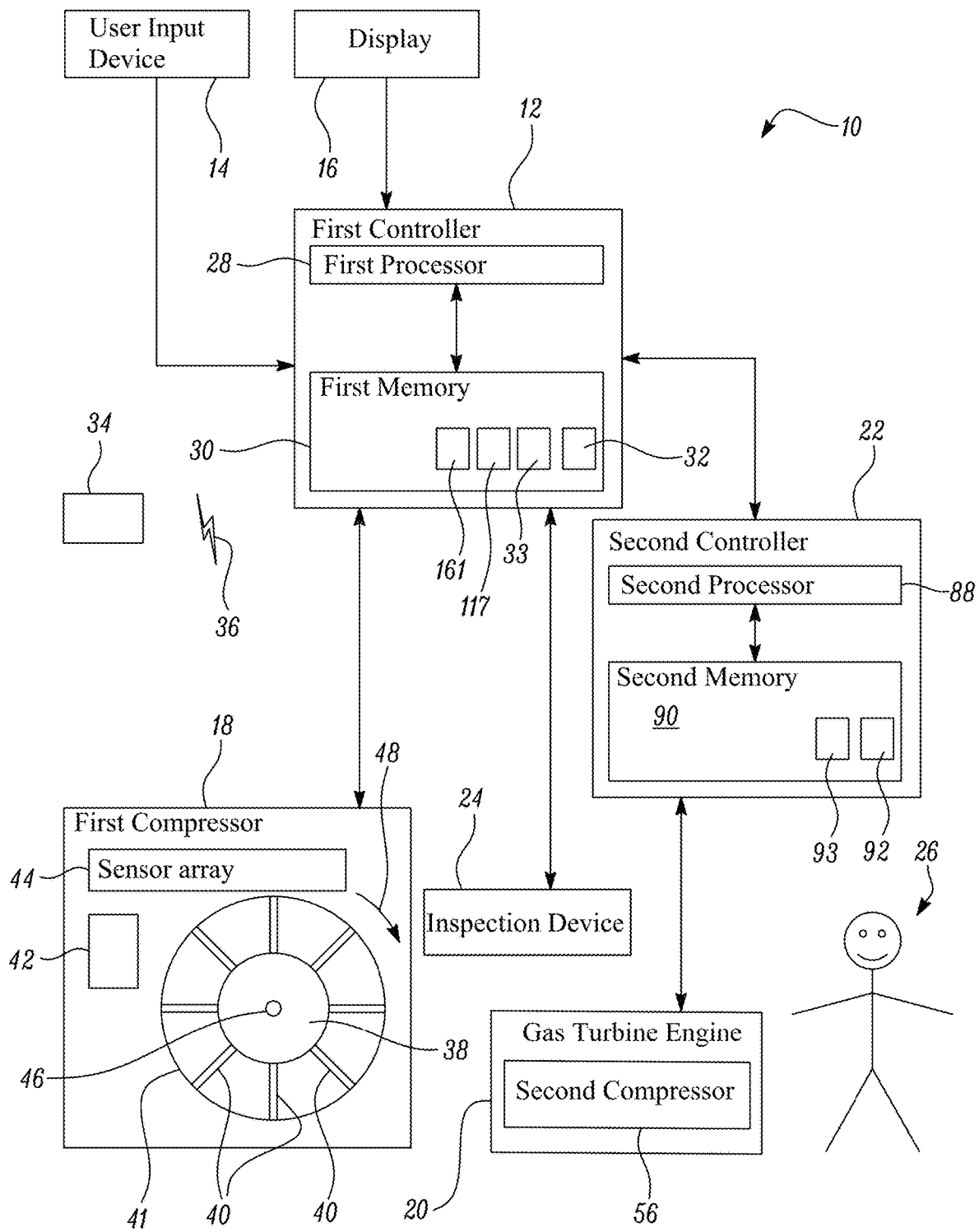
FIG. 1 illustrates a schematic diagram of apparatus according to various examples.

FIG. 1 illustrates a schematic diagram of an apparatus 10 according to various examples. The apparatus 10 includes a first controller 12, a user input device 14, a display 16, a first compressor 18, a gas turbine engine 20, a second controller 22 and an inspection device 24. FIG. 1 also illustrates an operator 26 (who may be human or robotic).

In summary, the apparatus 10 may be configured to enable one or more machine learning algorithms to be trained using data from the first compressor 18. The one or more machine learning algorithms may then be used to determine the operability of a compressor of the gas turbine engine 20. The apparatus 10 may also be configured to control the operation of the gas turbine engine 20 using the determined operability of the compressor of the gas turbine engine 20. It should be appreciated that the methods described herein may also be applied to other components of a gas turbine engine (for example, liners in the primary air system of the gas turbine engine) to train one or more machine learning algorithms, determine the operability of the gas turbine engine 20, and to control the operation of the gas turbine engine using the determined operability.

It should be appreciated that the apparatus 10 may be modular. As used herein, the wording 'module' refers to a device or apparatus where one or more features are included at a later time and, possibly, by another manufacturer or by an end user. For example, where the apparatus 10 is modular, the apparatus 10 may only include the first controller 12 and/or the second controller 22, and the remaining features illustrated in FIG. 1 (such as the first compressor 18, the gas turbine engine 20 and so on) may be added by one or more third parties.

The first controller 12, the user input device 14, the display 16, the first compressor 18, the gas turbine engine 20, the second controller 22 and the inspection device 24 may be coupled to one another via wireless links and may consequently comprise transceiver circuitry and one or more antennas. Additionally or alternatively, the first controller 12, the user input device 14, the display 16, the first compressor 18, the gas turbine engine 20, the second controller 22 and the inspection device 24 may be coupled to one another via wired links and may consequently comprise interface circuitry (such as a Universal Serial Bus (USB) plugs and sockets).

Figure 4:
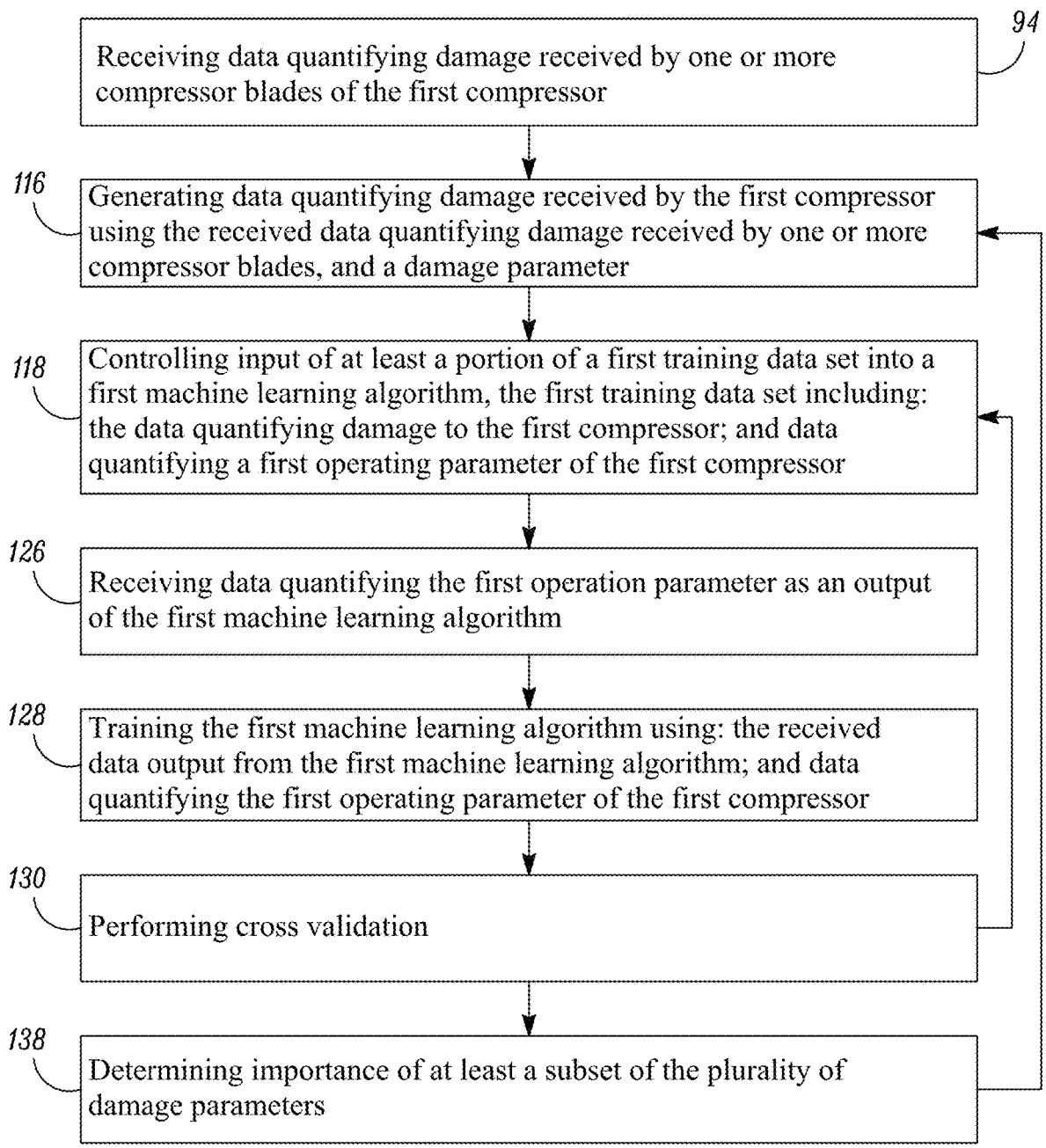
FIG. 4 illustrates a flow diagram of a method for training a machine learning algorithm according to various examples.
Figure 12:
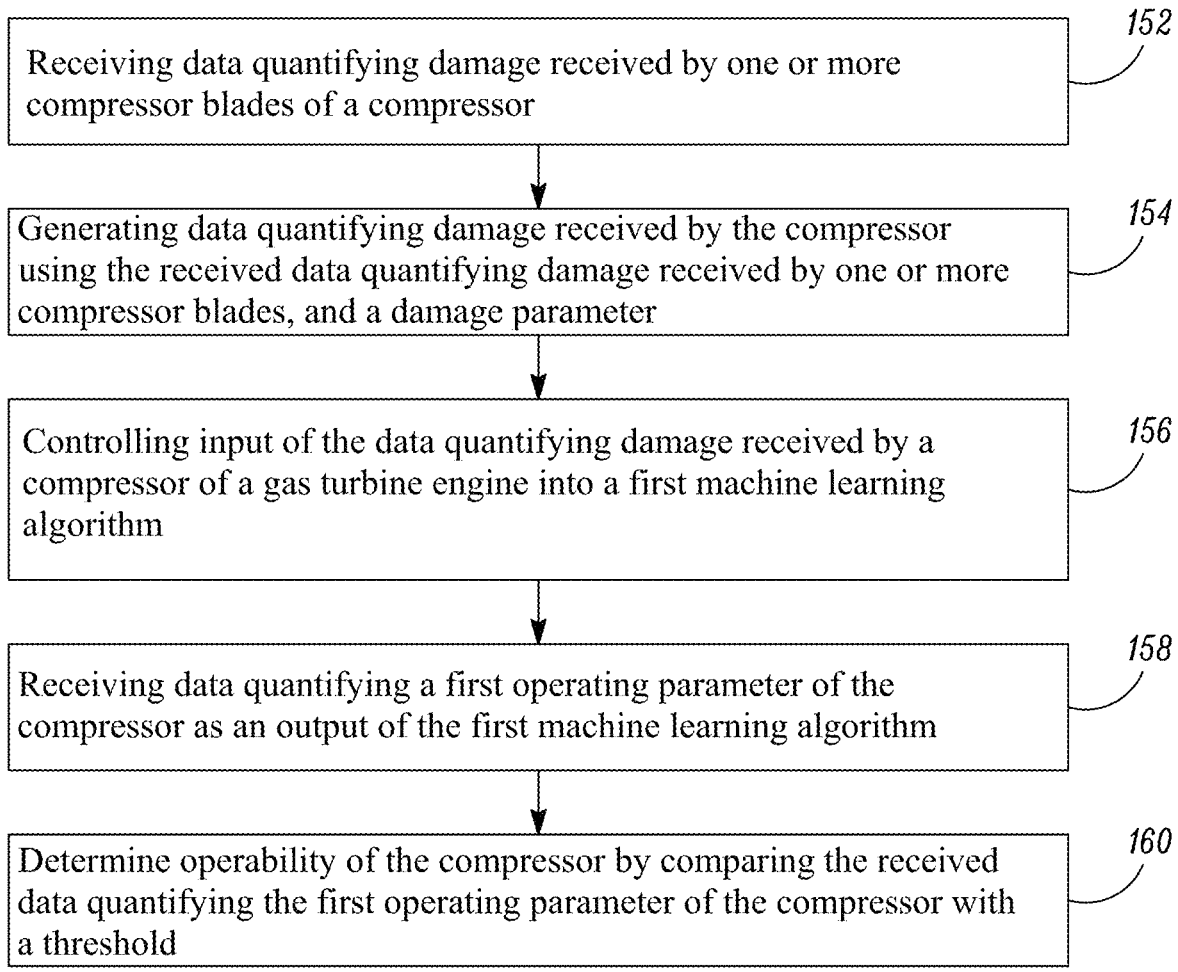
FIG. 12 illustrates a flow diagram of a method of determining compressor operability according to various examples.
Figure 13:
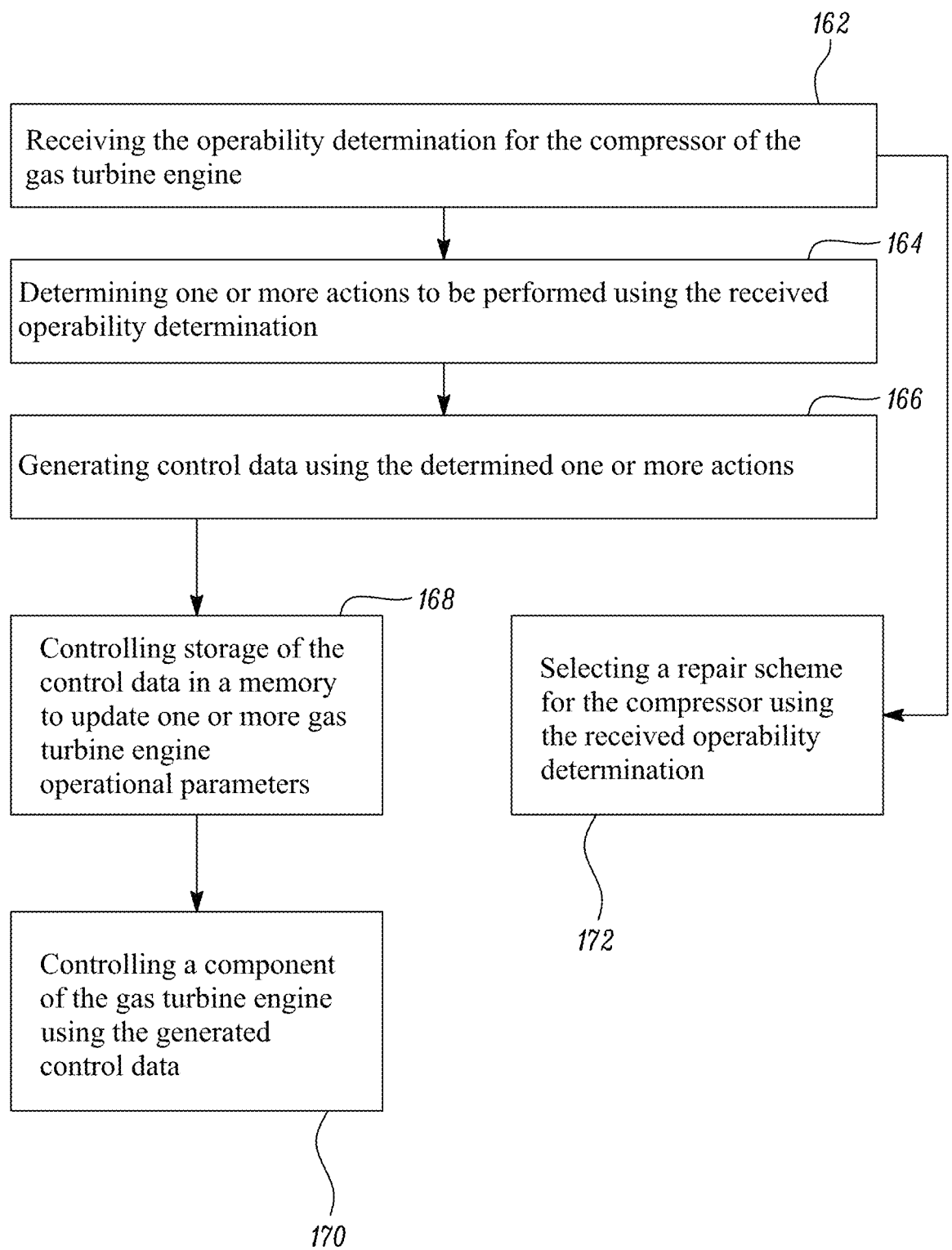
FIG. 13 illustrates a flow diagram of a method of using the operability determination according to various examples.

The first controller 12 may comprise any suitable circuitry configured to cause performance of the methods described herein and as illustrated in FIGS. 4, 12 and 13. The first controller 12 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), configured to perform the methods.

In various examples, the first controller 12 may comprise a first processor 28 and a first memory 30. The first memory 30 stores a first computer program 32 comprising computer readable instructions that, when read by the first processor 28, causes performance of the methods described herein, and as illustrated in FIGS. 4, 12 and 13. The first computer program 32 may be software or firmware, or may be a combination of software and firmware.

The first memory 30 also stores one or more machine learning algorithms 33. In the examples described throughout the detailed description, the one or more machine learning algorithms 33 are one or more artificial neural networks. However, in other examples, the one or more machine learning algorithms 33 may be any other suitable supervised learning algorithm (that is, a function that maps an input to an output based on example input-output pairs). For example, the one or more machine learning algorithms 33 may be one or more support vector machines.

The first processor 28 may include at least one microprocessor and may comprise a single core processor, may comprise multiple processor cores (such as a quad core processor or an octa core processor), or may comprise a plurality of processors (at least one of which may comprise multiple processor cores). The first memory 30 may be any suitable non-transitory computer readable storage medium, data storage device or devices, and may comprise one or more magnetic hard disk drives (HDD) and/or one or more solid state drives (SSD). The first memory 30 may be permanent non-removable memory, or may be removable memory (such as a universal serial bus (USB) flash drive or a secure digital (SD) card). The first memory 30 may include: local memory employed during actual execution of the computer program; bulk storage; and cache memories which provide temporary storage of at least some computer readable or computer usable program code to reduce the number of times code may be retrieved from bulk storage during execution of the code.

The first computer program 32 may be stored on a non-transitory computer readable storage medium 34. The first computer program 32 may be transferred from the non-transitory computer readable storage medium 34 to the first memory 30. The non-transitory computer readable storage medium 34 may be, for example, a USB flash drive, a secure digital (SD) card, an optical disc (such as a compact disc (CD), a digital versatile disc (DVD) or a Blu-ray disc). In some examples, the first computer program 32 may be transferred to the first memory 30 via a signal 36 (such as a wireless signal or a wired signal).

Input/output devices may be coupled to the first controller 12 either directly or through intervening input/output controllers. Various communication adaptors may also be coupled to the first controller 12 to enable the first controller 12 to become coupled to other apparatus or remote printers or storage devices through intervening private or public networks. Non-limiting examples include modems and network adaptors of such communication adaptors.

The user input device 14 may comprise any suitable device for enabling an operator to at least partially control the apparatus 10. For example, the user input device 14 may comprise one or more of a keyboard, a keypad, a touchpad, a touchscreen display, and a computer mouse. The first controller 12 is configured to receive signals from the user input device 14.

The display 16 may be any suitable display for conveying information to the operator 26. For example, the display 16 may be a liquid crystal display, a light emitting diode display, an active matrix organic light emitting diode display, a thin film transistor display, or a cathode ray tube display. The first controller 12 is arranged to provide a signal to the display 16 to cause the display 16 to convey information to the operator 26.

The first compressor 18 comprises one or more rotor disks 38, a plurality of compressor blades 40, a case 41, a high pressure air source 42, and a sensor array 44. The first compressor 18 may be an apparatus that is built specifically for test purposes and may be referred to as a 'compressor rig'. In other examples, the first compressor 18 may be part or module of a gas turbine engine.

The one or more rotor disks 38 have an axis 46 that extends perpendicularly through the centre of the one or more rotor disks 38. The one or more rotor disks 38 are mounted on bearings and are rotatable around the axis 46 as indicated by arrow 48.

The compressor blades 40 are attachable to, and detachable from the one or more rotor disks 38. The case 41 has an annular shape and surrounds the one or more rotor disks 38 and the plurality of compressor blades 40. Each of the compressor blades 40 has some degree of damage (including no damage). The compressor blades 40 may be attached to the one or more rotor disks 38 in different arrangements so that the first compressor 18 may have different damage profiles. In other words, the variation in damage to the compressor blades 40 when viewed as a function of angular position around the first compressor 18 may be different for different arrangements of compressor blades 40.

In some examples, 'damaged' compressor blades 40 may be formed by machining undamaged compressor blades using a computer numerically controlled (CNC) machine tool to define boroblended geometries with material removed at the leading edge (which may be referred to as a 'cutback'). In others examples, the compressor blades 40 may be formed through a casting process where a plurality of molds are used to provide compressor blades having different degrees of damage.

Figure 2:
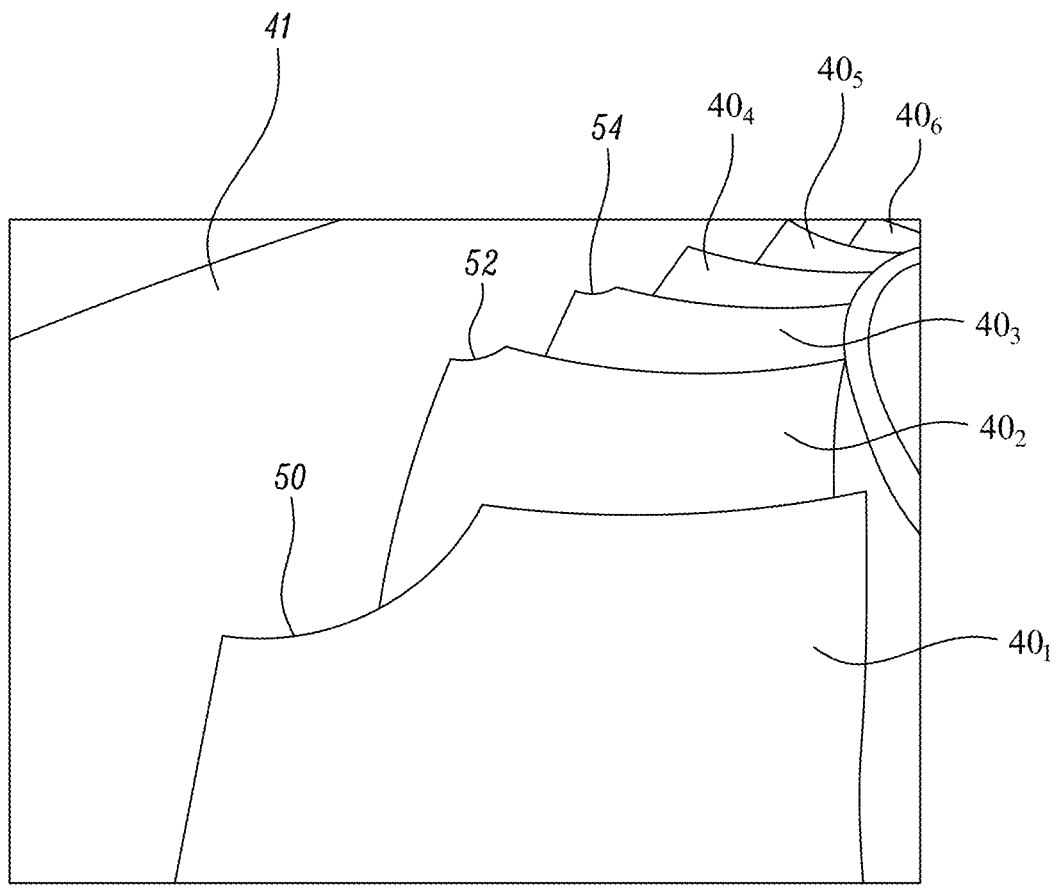
FIG. 2 illustrates a perspective view of the first compressor according to an example.

In one example, a first subset of the plurality of compressor blades 40 may have no damage, a second subset of the compressor blades 40 may have a leading edge cutback of five percent of the chord and span, a third subset of the compressor blades 40 may have a leading edge cutback of ten percent of the chord and span, a fourth subset of the compressor blades 40 may have a leading edge cutback of thirty percent of the chord and span, and a fifth subset of the compressor blades 40 may have a leading edge cutback of fifty percent of the chord and span. For example, FIG. 2 illustrates a first compressor blade $40_1$ having a leading edge cutback 50 of thirty percent of the chord and span, second and third compressor blades $40_2$, $40_3$ having leading edge cutbacks 52, 54 of ten percent of the chord and span, and fourth, fifth and sixth compressor blades $40_4$, $40_5$, $40_6$ having no damage.

In some examples, the first compressor 18 may be a rapid testing compressor rig such as the 'Gibbons compressor rig' at the Whittle Laboratory, Cambridge University, the United Kingdom. The Gibbons compressor rig is a single stage machine that is representative of a modern high pressure aero engine compressor and has a rotor inlet relative Mach number of 0.4 and a Reynolds number of $5 \times 10^5$. The rapid testing features of the Gibbons compressor rig that enable accelerated testing include:

Design of the inlet and bearing assembly to allow access to the compressor blades 40 with minimal deconstruction. As the rotor disk 38 is never removed, alignment does not need to be repeated between builds.

Compressor blades 40 are machined from solid with root, platform and blade in one piece so they can be assembled without stagger or tip clearance setting.

Compressor blade 40 root clamps are segmented so that compressor blades 40 can be replaced one or two at a time.

Each rotor is individually counterweighted to account for the material lost in the damage; the whole rotor assembly does not need balancing between builds.

Returning to FIG. 1, the high pressure air source 42 is arranged to supply flowing air to the compressor blades 40 to cause the compressor blades 40 to rotate around the axis 46. The first controller 12 may be configured to control the high pressure air source 42 to provide flowing air to the plurality of compressor blades 40.

The sensor array 44 is configured to sense one or more operating parameters of the first compressor 18. For example, the sensor array 44 may comprise one or more Pitot probes that are configured to sense the inlet total pressure, and one or more sensors that are configured to sense the static pressure of the first compressor 18. The sensor array 44 is calibrated to calculate the total flow coefficient and the integrated pressure rise of the first compressor 18. The first controller 12 is configured to receive data quantifying the one or more operating parameters sensed by the sensor array 44.

The gas turbine engine 20 may be mounted on a vehicle such as an aircraft, marine vessel, or a ground vehicle such as a tank. For aero-engines, this is usually referred to as 'on-wing'. Alternatively, the gas turbine engine 20 may be detached from such a vehicle (that is, 'off-wing' for an aero-engine). The gas turbine engine 20 comprises a second compressor 56 that has the same structure as, or a very similar structure to, the first compressor 18. For example, the compressor blades of the second compressor 56 may have the same (or very similar) geometry as the compressor blades 40 of the first compressor 18.

Figure 3:
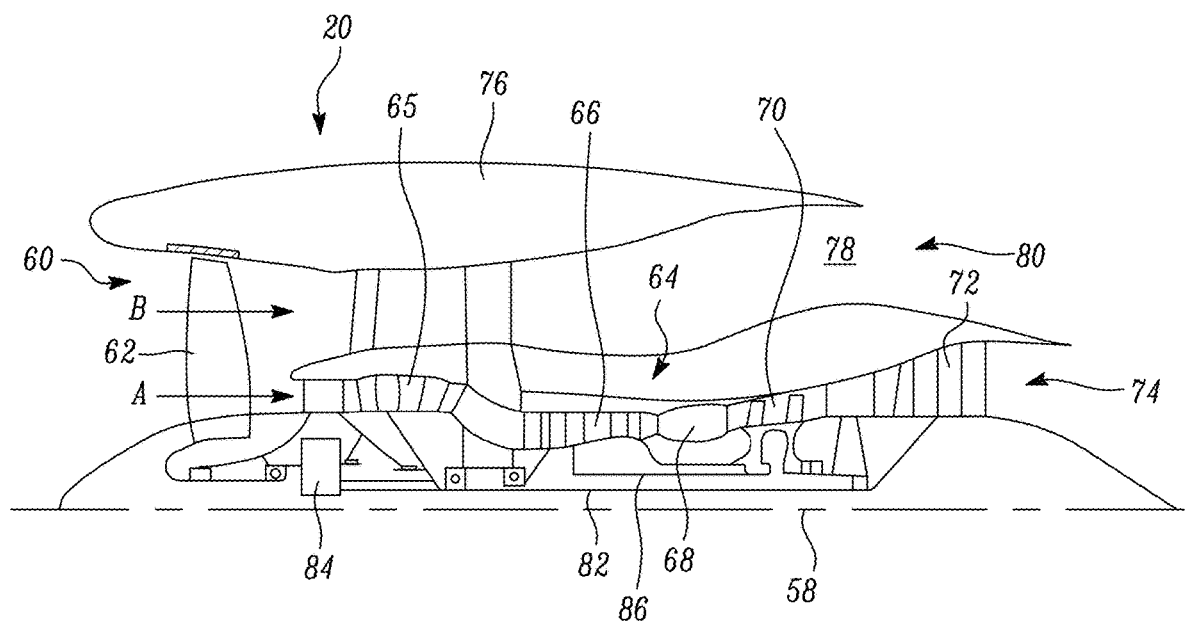
FIG. 3 illustrates a cross sectional diagram of a gas turbine engine according to an example.

FIG. 3 illustrates a cross sectional side view of the gas turbine engine 20 according to an example. The gas turbine engine 20 has a principal rotational axis 58 and comprises an air intake 60 and a propulsive fan 62 that generates two airflows: a core airflow A and a bypass airflow B. The gas turbine engine 20 comprises a core 64 that receives the core airflow A. The engine core 64 comprises, in axial flow series, a low pressure compressor 65, a high-pressure compressor 66, combustion equipment 68, a high-pressure turbine 70, a low pressure turbine 72 and a core exhaust nozzle 74. A nacelle 76 surrounds the gas turbine engine 20 and defines a bypass duct 78 and a bypass exhaust nozzle 80. The bypass airflow B flows through the bypass duct 78. The fan 62 is attached to and driven by the low pressure turbine 72 via a shaft 82 and an epicyclic gearbox 84. The high pressure compressor 66 is attached to and driven by the high pressure turbine 70 via a shaft 86.

In some examples, the low pressure compressor 65 may be the second compressor 56 illustrated in FIG. 1. In other examples, the high pressure compressor 66 may be the second compressor 56 illustrated in FIG. 1.

In use, the core airflow A is accelerated and compressed by the low pressure compressor 56 and directed into the high pressure compressor 66 where further compression takes place. The compressed air exhausted from the high pressure compressor 66 is directed into the combustion equipment 68 where it is mixed with fuel and the mixture is combusted. The resultant hot combustion products then expand through and thereby drive, the high pressure and low pressure turbines 70, 72 before being exhausted through the nozzle 74 to provide some propulsive thrust. The high pressure turbine 70 drives the high pressure compressor 66 via the shaft 86, and the low pressure turbine 72 drives the low pressure compressor 65 via the shaft 82, and drives the fan 62 via the shaft 82 and the epicyclic gearbox 84. The fan 62 generally provides the majority of the propulsive thrust. The epicyclic gearbox 84 is a reduction gearbox and may have a star or planetary configuration.

Returning to FIG. 1, the second controller 22 may comprise any suitable circuitry configured to cause performance of the methods described herein with reference to FIG. 13. For example, the second controller 22 may be an engine control unit (ECU), an electronic engine controller (EEC), or a full authority digital engine control (FADEC). The second controller 22 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), configured to perform the methods illustrated in FIG. 13.

The second controller 22 may comprise a second processor 88 and a second memory 90. The second memory 90 stores a second computer program 92 comprising computer readable instructions that, when read by the second processor 88, causes performance of the methods described herein with reference to FIG. 13. The second computer program 92 may be software or firmware, or may be a combination of software and firmware.

The second memory 90 also stores engine operating parameters 93. The second controller 22 is configured to use the engine operating parameters 93 to control the operation of the gas turbine engine 20.

The second processor 88 may include at least one microprocessor and may comprise a single core processor, may comprise multi-core processor (such as a quad core processor or an octa core processor), or may comprise a plurality of processors (at least one of which may comprise multiple processor cores). The second memory 90 may be any suitable non-transitory computer readable storage medium, data storage device or devices, and may comprise one or more magnetic hard disk drives (HDD) and/or one or more solid state drives (SSD). The second memory 90 may be permanent non-removable memory, or may be removable memory (such as a universal serial bus (USB) flash drive or a secure digital (SD) card). The second memory 90 may include: local memory employed during actual execution of the computer program; bulk storage; and cache memories which provide temporary storage of at least some computer readable or computer usable program code to reduce the number of times code may be retrieved from bulk storage during execution of the code.

The second computer program 92 may be stored on the non-transitory computer readable storage medium 34 (separately, or in addition to, the first computer program 32). The second computer program 92 may be transferred from the non-transitory computer readable storage medium 34 to the second memory 90.

In some examples, the second computer program 92 may be transferred to the second memory 90 via a signal.

Input/output devices may be coupled to the second controller 22 either directly or through intervening input/output controllers. Various communication adaptors may also be coupled to the second controller 22 to enable the second controller 22 to become coupled to other apparatus or remote printers or storage devices through intervening private or public networks. Non-limiting examples include modems and network adaptors of such communication adaptors.

The inspection device 24 may be any suitable device that enables the second compressor 56 to be inspected. In one example, the inspection device 24 is a borescope that may be used by the operator 26 to visually inspect the second compressor 56. In another example, the inspection device 24 may comprise a digital camera that is configured to generate digital images of the compressor blades of the second compressor 56. The motion of the inspection device 24 may be controlled by the operator 26 or by the first controller 12 (where the inspection device 24 is a continuum robot for example).

Training

Methods of training the one or more machine learning algorithms 33 are described in the following paragraphs with reference to FIG. 4.

At block 94, the method may include receiving data quantifying damage received by the one or more compressor blades 40 of the first compressor 18. For example, the operator 26 may first attach the compressor blades 40 to the one or more rotor disks 38 of the first compressor 18 according to a desired damage profile. The operator 26 may then operate the user input device 14 to enter data that quantifies the damage received by the one or more compressor blades 40. For example, for each of the compressor blades 40, the operator 26 may enter a percentage of damage received by the leading edge. Alternatively, the operator 26 may operate an imaging device to generate images of each of the compressor blades 40. The first controller 12 may receive the generated images and quantify the damage received using image recognition software and a model of the compressor blades in an undamaged state.

Figure 5:
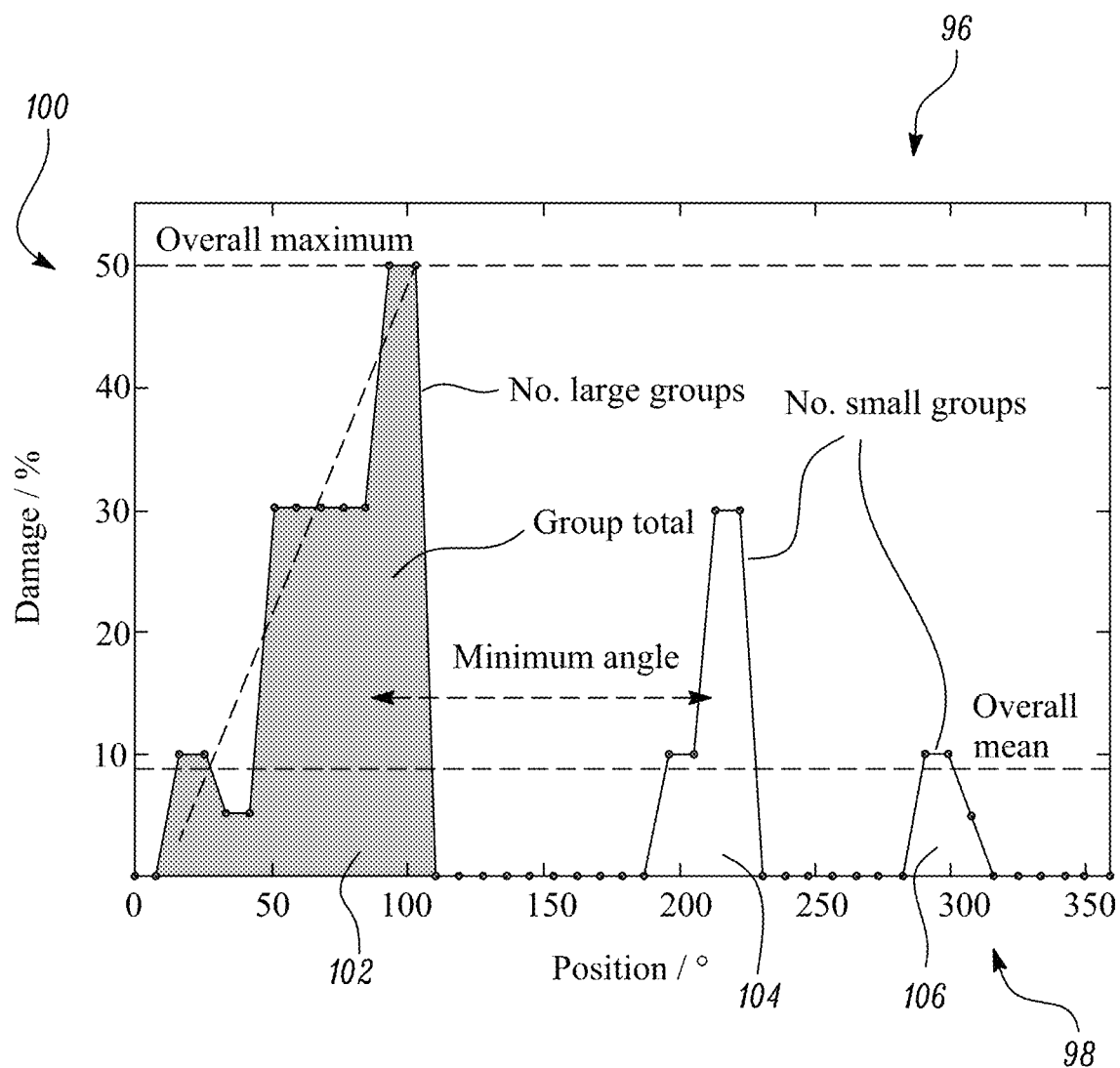
FIG. 5 illustrates a graph of compressor blade damage versus position for the first compressor according to an example.

FIG. 5 illustrates a graph 96 of compressor blade damage versus position for the first compressor 18 according to one example damage profile. The graph 96 includes a horizontal axis 98 for angular position around the axis 46 and a vertical axis 100 for the percentage of damage received by the leading edges of the compressor blades 40.

The graph 96 illustrates a first group 102, a second group 104, and a third group 106 of damaged compressor blades 40. The first group 102 is positioned between the angular positions of approximately fifteen degrees and one hundred degrees. The second group 104 is positioned between the angular positions of approximately one hundred and ninety degrees and two hundred and twenty degrees. The third group 106 is positioned between the angular positions of approximately two hundred and ninety degrees and three hundred and eight degrees.

The first group 102 has a maximum damage percentage of fifty percent between the angular positions of approximately ninety two degrees and one hundred degrees. The second group 104 has a maximum damage percentage of thirty percent between the angular positions of approximately two hundred and eight degrees and two hundred and twenty degrees. The third group 106 has a maximum damage percentage of ten percent between the angular positions of approximately two hundred and ninety degrees and three hundred degrees.

Returning to FIG. 4, at block 94 the method may also include receiving data quantifying at least a first operating parameter of the first compressor 18. For example, once the compressor blades 40 have been attached to the one or more rotor disks 38 of the first compressor 18, the first controller 12 may control the high pressure air source 42 to supply flowing air to the compressor blades 40 to cause the compressor blades 40 to rotate around the axis 46. The sensor array 44 may sense the total-static pressure rise and the inlet flow coefficient of the first compressor 18 and generate data of these operating parameters. The first controller 12 may receive the generated data quantifying the total-static pressure rise and the inlet flow coefficient from the sensor array 44.

Figure 6:
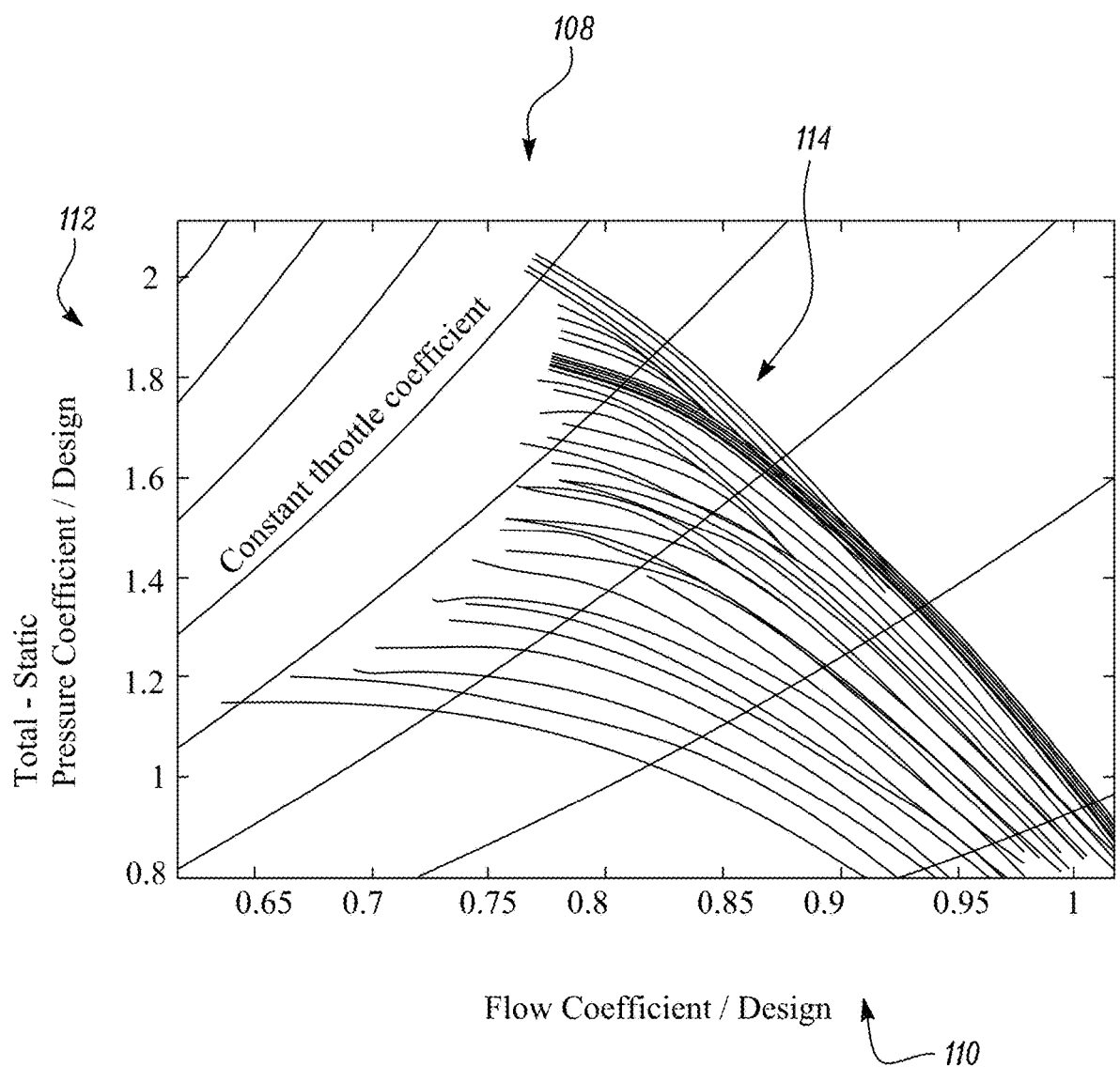
FIG. 6 illustrates a graph of total-static pressure coefficient versus flow coefficient for the first compressor according to an example.

In one example, one hundred and twenty five different damage profiles were investigated. For each damage profile, the first compressor 18 was throttled into stall three times and the stalling throttle coefficient was determined from the last stable recorded point. FIG. 6 illustrates a graph 108 of total-static pressure coefficient versus flow coefficient for the one hundred and twenty five different damage profiles of the first compressor 18. The graph 108 includes a horizontal axis 110 for the flow coefficient and a vertical axis 112 for the total-static pressure coefficient. The graph 108 also includes one hundred and twenty five lines 114 that represent how the total-static pressure coefficient of the first compressor 18 varies with flow coefficient for each of the one hundred and twenty five damage profiles respectively. Generally speaking, those lines that have higher total-static pressure coefficients at a given flow coefficient are generated from damage profiles having less damage than those lines that have lower total-static pressure coefficients.

Returning to FIG. 4, at block 116 the method may include generating data quantifying damage received by the first compressor 18 using the received data quantifying damage received by one or more compressor blades 40, and a damage parameter. Block 116 may be repeated where it is desired to generate data quantifying damage from multiple different damage parameters. The output from block 116 is one or more training data sets 117.

A damage parameter quantifies a damage profile of the first compressor 18. If the parameterization can be based on physical understanding, then the required quantity of training data may be significantly reduced (for example, by a factor of one). Parameterization may achieve this because it conditions the machine learning algorithm 33 to the physics of the problem. Parameterization reduces the number of dimensions from the number of blades in the annulus down to the number of physical sensitivities identified.

For example, a damage parameter may be an amount of damage to a portion of the first compressor 18 (such as the amount of damage received by compressor blades 40). By way of another example, a damage parameter may be one or more separations between portions of the first compressor 18 (for example, a separation between adjacent damaged portions of the first compressor 18 (such as the separation between adjacent groups of compressor blades 40)). By way of a further example, a damage parameter may be a gradient of damage across at least a portion of the first compressor 18 (such as the gradient of damage across a group of compressor blades 40). By way of another example, a damage parameter may be a number of damaged portions of the first compressor 18 (such as the fraction of compressor blades 40 having damage within a percentage range).

To identify the physics of the problem, a questionnaire was circulated to current and retired compressor aerodynamicists in the Whittle Laboratory and Rolls-Royce. In the questionnaire was a description of the problem, a sample plot of damage around the annulus and example physical parameters (mean and maximum damage in the annulus). Both academic and industry engineers responded to provide exact functions that can be used to parameterise the damage, for example, it matters whether heavily damaged blades are on the edges of a cluster or in the centre.

The information from the questionnaire was used to inform the choice of ten damage parameters, they are shown in FIG. 7 and summarised below:
1. Mean magnitude of damage in the whole annulus
2. Maximum magnitude of damage in the whole annulus
3. Total damage within the worst sixty degree sector
4. Total damage within the worst one hundred and eighty degree sector
5. Greatest damage gradient in a seventy five degree sector
6. Greatest damage concentration in a seventy five degree sector
7. Fraction of the row with greater than forty percent damage
8. Fraction greater than twenty percent and less than forty percent damage
9. Fraction greater than eight percent and less than twenty percent damage
10. Fraction greater than zero percent and less than eight percent damage Damage parameters one to four are calculated by convolving rotor damage as a function of position with the basis functions plotted in FIG. 7b. Take the second damage parameter above as an example, by convolving the maximum magnitude of damage in the whole annulus with the damage function in FIG. 7a, the magnitude of damage on a single compressor blade is returned. The basis function is then indexed by one rotor position and the convolution is repeated. The maximum value is taken as the parameter for input into the artificial neural network 33. This is equivalent to the maximum damage in the row. This process may be repeated for damage parameters one or four to give a measure of the circumferential distribution of damage in the row.

Damage parameters five and six are calculated in two steps. First the damage function is convolved with basis function A, shown in FIG. 7c, and the maximum value is recorded after indexing to all positions. Then, this is repeated for function B (also shown in FIG. 7c), the damage parameter input into the artificial neural network 33 is the difference between these two values. If the value is positive that means the damage function looks more like function A, if it is negative it looks more like function B.

Figure 7A:
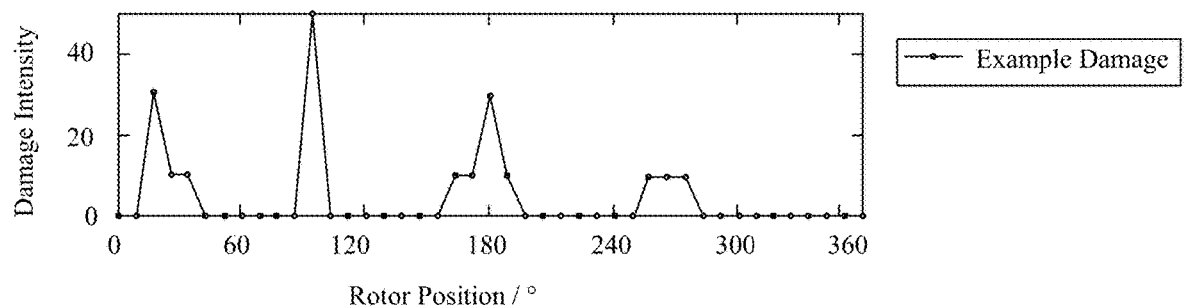
FIGS. 7a, 7b, 7c, 7d illustrate graphs of damage intensity or function intensity versus position according to an example.
Figure 7B:
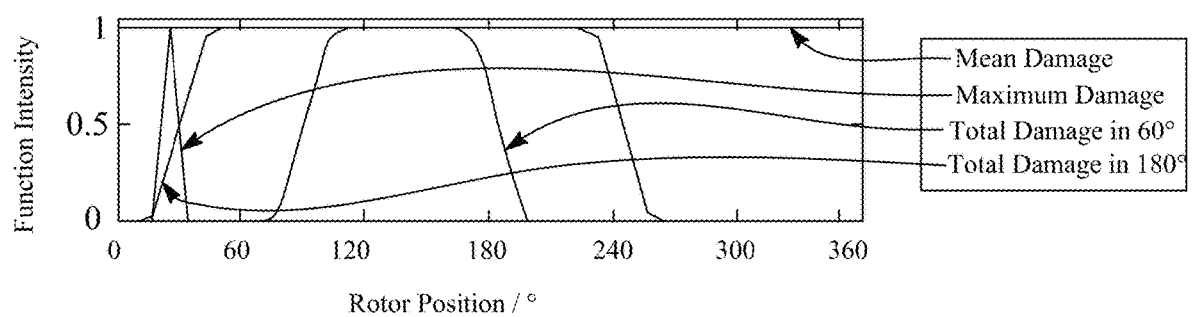
Figure 7C:
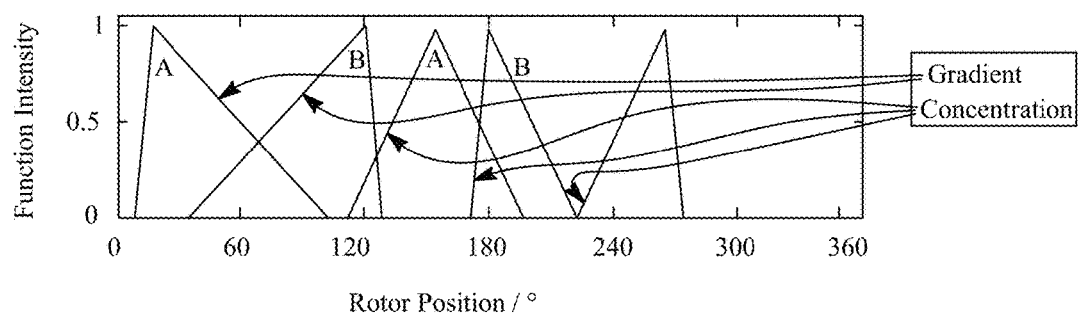
Figure 7D:
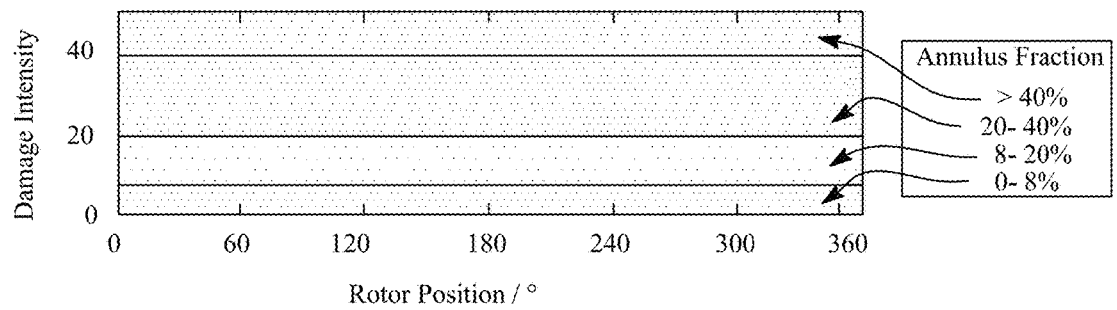

Damage parameters seven to ten are conditional statements based upon the intensity of damage and are illustrated in FIG. 7d. It was found that the stalling throttle coefficient was a non-linear function of damage magnitude which the first six functions do not clearly discriminate. For example, the third parameter would treat the case of one compressor blade with fifty percent damage the same as the case of five compressor blades with ten percent damage. Damage parameters seven and nine would highlight this particular difference clearly.

The data quantifying the first operating parameter of the first compressor 18 (generated at block 94) and the data quantifying damage received by the first compressor 18 (generated at block 116) forms a first training data set. It should be appreciated that additional training data sets (for example, a second training data set) may be formed where data quantifying more than one operating parameter is generated at block 94.

At block 118, the method includes controlling input of at least a portion of the first training data set into the first machine learning algorithm 33. Where the memory 30 stores a plurality of machine learning algorithms 33, different training data sets may be input into each of the plurality of machine learning algorithms 33. For example, where the memory 30 stores a second machine learning algorithm, the method may include controlling input of at least a portion of the second training data set into the second machine learning algorithm.

As mentioned previously, the first machine learning algorithm 33 may be a first artificial neural network. An artificial neural network is assembled using a combination of transfer functions, linear and non-linear curves contained within one or more "hidden layers" that can be used to model the data. These are combined to form a flexible mathematical function, which describes both linear and non-linear relationships. Therefore, artificial neural networks can describe a large number of different mathematical relationships without laborious selection of basis functions.

Figure 8:
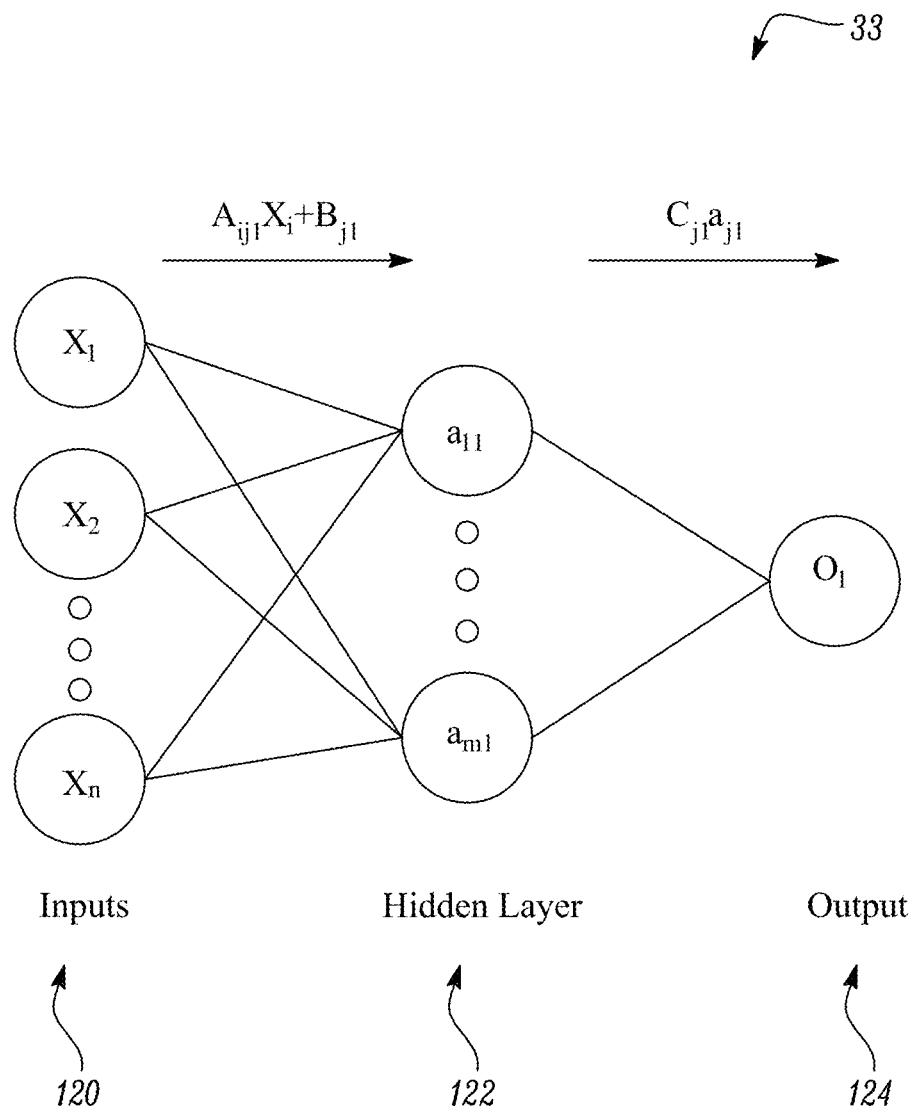
FIG. 8 illustrates a schematic diagram of an artificial neural network according to an example.

FIG. 8 illustrates a schematic diagram of the first artificial neural network 33 according to example. The first artificial neural network 33 includes a plurality of inputs 120 ($x_1$ to $x_n$), a hidden layer 122 ($a_{11}$ to $a_{m1}$) and an output 124 ($O_1$).

To get an optimal number of curves or neurons within the artificial neural network function, the first controller 12 may perform cross validation as described in greater detail later in the detailed description. Additionally, the first controller 12 may exploit connected weights to understand the importance of each damage parameter.

The first artificial neural network 33 may be defined as follows:

$$O = \tanh \sum_{j=1}^{m} C_j \tanh(B_j + \sum_{i=1}^{n} A_{ij} x_{ji}) \quad (1)$$

Where $C_j$, $B_j$, and $A_{ij}$ are learned weights from the training process described in greater detail later in the detailed description, i is the number of input variables and j is the number of hidden nodes.

The first controller 12 is configured to use at least the first artificial neural network 33 to establish the unknown correlation between the defined damage parameters and the operability of a damaged compressor. In some examples, two artificial neural networks are used: a first artificial neural network $33_1$ to model the stalling throttle coefficient and a second artificial neural network $33_2$ to model the pressure rise characteristic.

At block 126, the method includes receiving data quantifying the first operating parameter as an output of the first machine learning algorithm 33. For example, the first controller 12 may execute the first artificial neural network $33_1$ and may then receive data quantifying the stalling throttle coefficient as an output of the first artificial neural network $33_1$.

Where the memory 30 stores a plurality of machine learning algorithms 33, the method may include receiving data quantifying a plurality of different operating parameters as an output of the plurality of machine learning algorithms 33. For example, where the memory 30 stores the second artificial neural network $33_2$, the first controller 18 may execute the second artificial neural network $33_2$ and may then receive data quantifying the pressure rise characteristic as an output of the second artificial neural network $33_2$.

At block 128, the method includes training the first machine learning algorithm 33 using: the received data output from the first machine learning algorithm 33; and the data quantifying the first operating parameter of the first compressor 18. The first controller 12 may perform optimization (for example, stochastic optimization) on the first artificial neural network $33_1$ using: the received data output from the first artificial neural network $33_1$; and the data quantifying the first operating parameter of the first compressor 18 (that is, by comparing the predicted value of the first operating parameter with the measured value of the first operating parameter). For example, the first controller 12 may perform any of simulated annealing, an evolutionary algorithm, or stochastic gradient descent on the first artificial neural network $33_1$ to optimize the weights $C_j$, $B_j$ and $A_{ij}$ in equation (1).

The pressure rise characteristic may be calculated as a reduction in the pressure rise coefficient relative to a datum undamaged case. In one example, fifty data points across the stable part of the first compressor's 18 pressure rise characteristic were used to train the pressure rise artificial neural network $33_2$. The stalling throttle coefficient (k) was used to train the stalling throttle coefficient artificial neural network $33_1$ and is shown in Equation (2). Lines of constant k are shown in FIG. 6 as the 'constant throttle coefficient'.

$$k = \frac{\psi}{\phi^2} \quad \text{Equation (2)}$$

Where $\psi$ is the total-static pressure rise and $\phi$ is the flow coefficient.

To learn the weights in equation (1) from the first training data set, equation (3) is minimized to give equal bias to each data point as a function of increasing error:

$$E = \Sigma_{k=1}^{l} |w_k(\tanh \Sigma_{j=1}^{m} C_j \tanh(B_i + \Sigma_{i=1}^{n} A_{ij} x_{ji})) - I_k| \quad \text{Equation (3)}$$

Where k represents the number of data points, $w_k$ represents the randomly chosen importance of the data point chosen by a cross validation strategy (where cross validation is part of the method), and $I_k$ represents the relevant experimental result.

The complexity of the first artificial neural network $33_1$ is determined by the number of hidden nodes, which is given as i in Equations 1 and 3. The output is then predicted by the sum of the functions within the hidden layer. In this example, a simulated annealing approach was used with up to $10^7$ iterations to ensure that the global minimum was found. This robust fitting mechanism ensures a high probability of finding a global minimum. In large artificial neural networks this is not generally an issue due to their flexibility, but in small artificial neural networks the possibility of obtaining a poor local minima or a saddle point is more probable.

At block 130, the method may include performing cross validation. For example, the first controller 12 may store a plurality of first artificial neural networks $33_1$ in the memory 30 where each of the first artificial neural networks $33_1$ comprises a different number of neurons in the hidden layer 122. The first controller 12 performs blocks 118, 126, 128 for each network of the plurality of first artificial neural networks $33_1$. It should be appreciated that where the memory 30 stores a plurality of different machine learning algorithms for different operating parameters, block 130 may include performing cross validation for one or more of those different machine learning algorithms.

In one example, in order to ensure the correct balance between generalisation and fit to the training data, nine models (i.e. nine different artificial neural networks) with a number of neurons ranging from 3 to 19 were created using a cross validation strategy. This approach ensured that over-fitting or retaining redundant features in the artificial neural network was avoided.

For the stalling throttle coefficient prediction, an artificial neural network with one hundred and twenty five data points and ten physical parameters was created. For the pressure rise artificial neural network, there were six thousand two hundred and fifty data points and the same ten physical parameters plus the flow coefficient itself (f), that is, eleven variables in total.

Data was randomly removed from the training set and a committee of models was generated with a range of different complexities. The standard deviation between the models was used to calculate the uncertainty. The results of this analysis are illustrated in FIG. 9.

Figure 9:
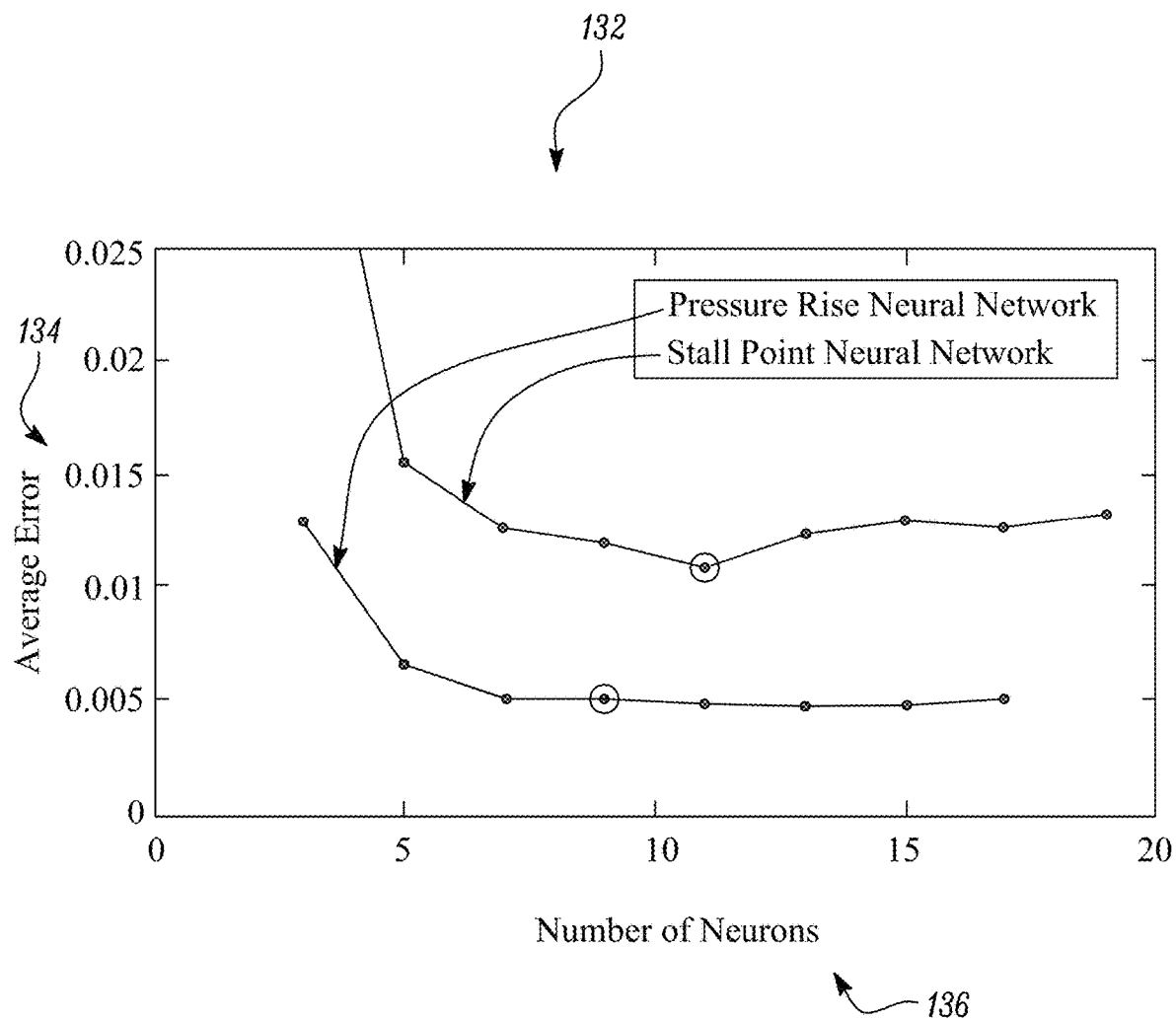
FIG. 9 illustrates a graph of average error versus number of neurons for a pressure rise artificial neural network and a stalling throttle coefficient artificial neural network according to an example.

In more detail, FIG. 9 illustrates a graph 132 comprising: a vertical axis 134 for average error; and a horizontal axis 136 for the number of neurons in the pressure rise artificial neural networks and the stalling throttle coefficient artificial neural networks. The graph 132 also includes a line for the pressure rise artificial neural networks and a line for the stalling throttle coefficient artificial neural networks.

The artificial neural network with the minimum overall error is considered to be the best. For the artificial neural network which models the stalling throttle coefficient, the optimal number of neurons was found to be eleven. Nine neurons were selected for the pressure rise artificial neural network (at nine neurons, the error becomes constant at 0.005 and to avoid over-fitting, it is best to choose a simpler network and fewer neurons).

At block 138, the method may include determining importance of at least a subset of the plurality of damage parameters. Where a damage parameter has an importance that does not meet a predetermined criterion (a minimum importance value for example), the method may return to block 116 and include re-generating the data quantifying damage received by the first compressor 18 without using that damage parameter. For example, the first controller 12 may determine the importance of the damage parameters and then repeat blocks 116, 118, 126 and 128 to train at least the first machine learning algorithm 33 using the most important damage parameters.

Although machine learning can cope with many dimensions, the accuracy suffers if too many parameters are used or if they are not independent from each other. The inventors have used machine learning to improve the parameterisation by using 'connected weights' to calculate the importance of each damage parameter. The importance of a damage parameter i is given by:

$$I_i = \Sigma_{j=1}^{m} A_{ij} C_j \qquad \text{Equation (4)}$$

Where $A_{ij}$, $C_j$ represent the non-bias machine learnt weights.

This method was used to optimise the sector sizes of the basis functions shown in FIG. 7. Artificial neural networks were trained with many sector sizes and the importance of each damage parameter and the correlation between predicted and actual results was examined. The damage parameters with low importance and poor correlation were discarded to give the damage parameters mentioned above under the discussion of block 116.

Figure 10:
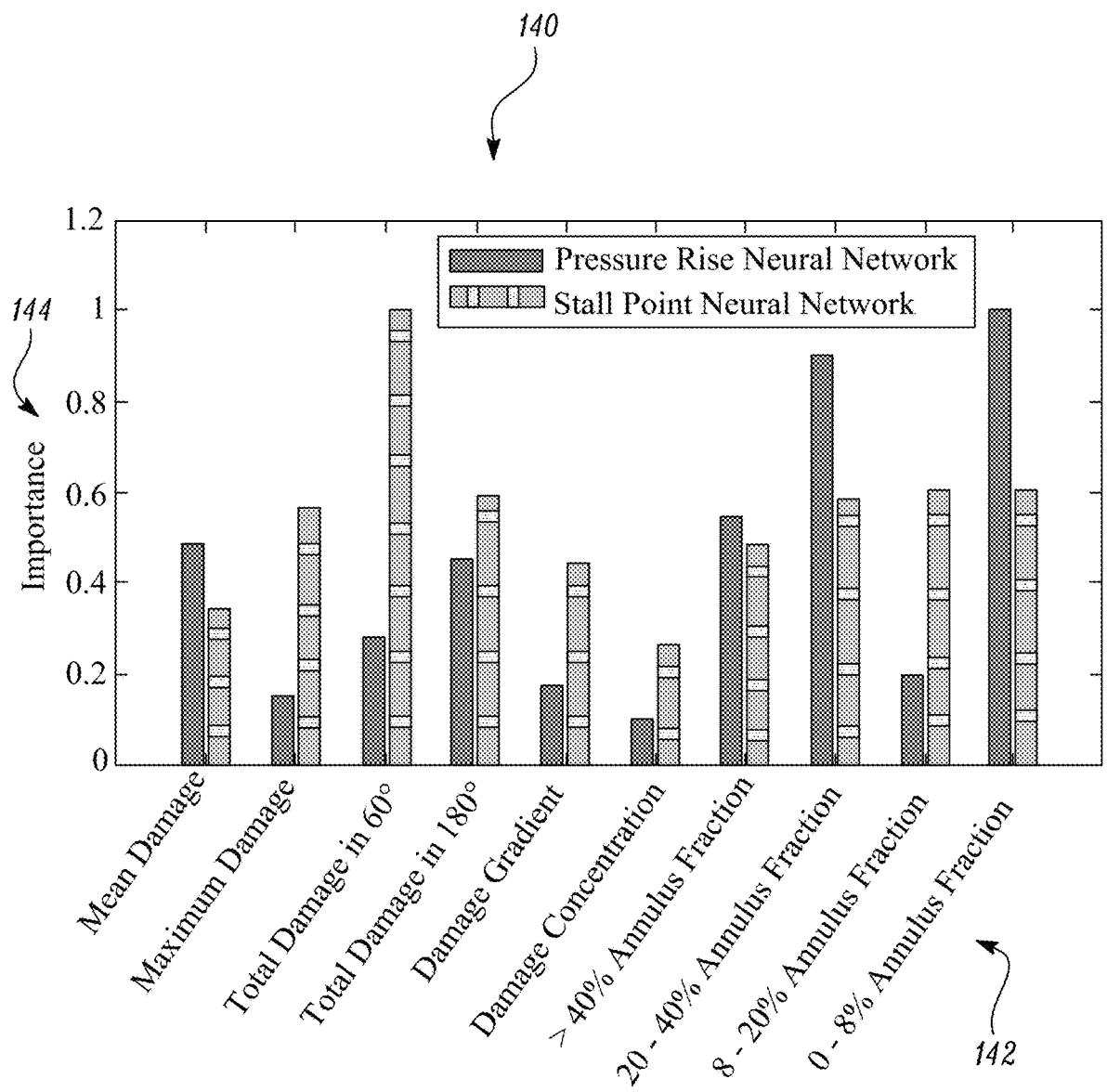
FIG. 10 illustrates a graph of importance versus damage parameter for the pressure rise artificial neural network and the stalling throttle coefficient artificial neural network according to an example.

The importance was calculated for the final parameters for both the stalling throttle coefficient and pressure rise artificial neural networks and is plotted in FIG. 10. This graph shows what types of damage are most important in affecting operability of a compressor.

In more detail, FIG. 10 illustrates a graph 140 comprising a horizontal axis 142 for damage parameter, and a vertical axis 144 for importance value. FIG. 10 shows that the pressure rise depends upon longer length scale damage parameters. Mean damage and the damage intensity parameters are most important. The 180° damage measure is more important than 60° and the damage gradient and concentration have low importance.

The stalling throttle coefficient depends upon shorter length scale parameters. Total damage in the worst 60° sector is by far the most important damage parameter. Maximum damage, gradient and concentration are also more important than in the pressure rise artificial neural network. The conditional damage parameters also show that lighter damaged blades are most important for stalling throttle coefficient prediction; 5%, 10% and 30% are more important than 50%.

The output from the methods illustrated in FIG. 4 is one or more trained machine learning algorithms 33 that may be used to determine the operability of a compressor in a gas turbine engine and this is described in greater detail below with reference to FIG. 12.

Figure 11:
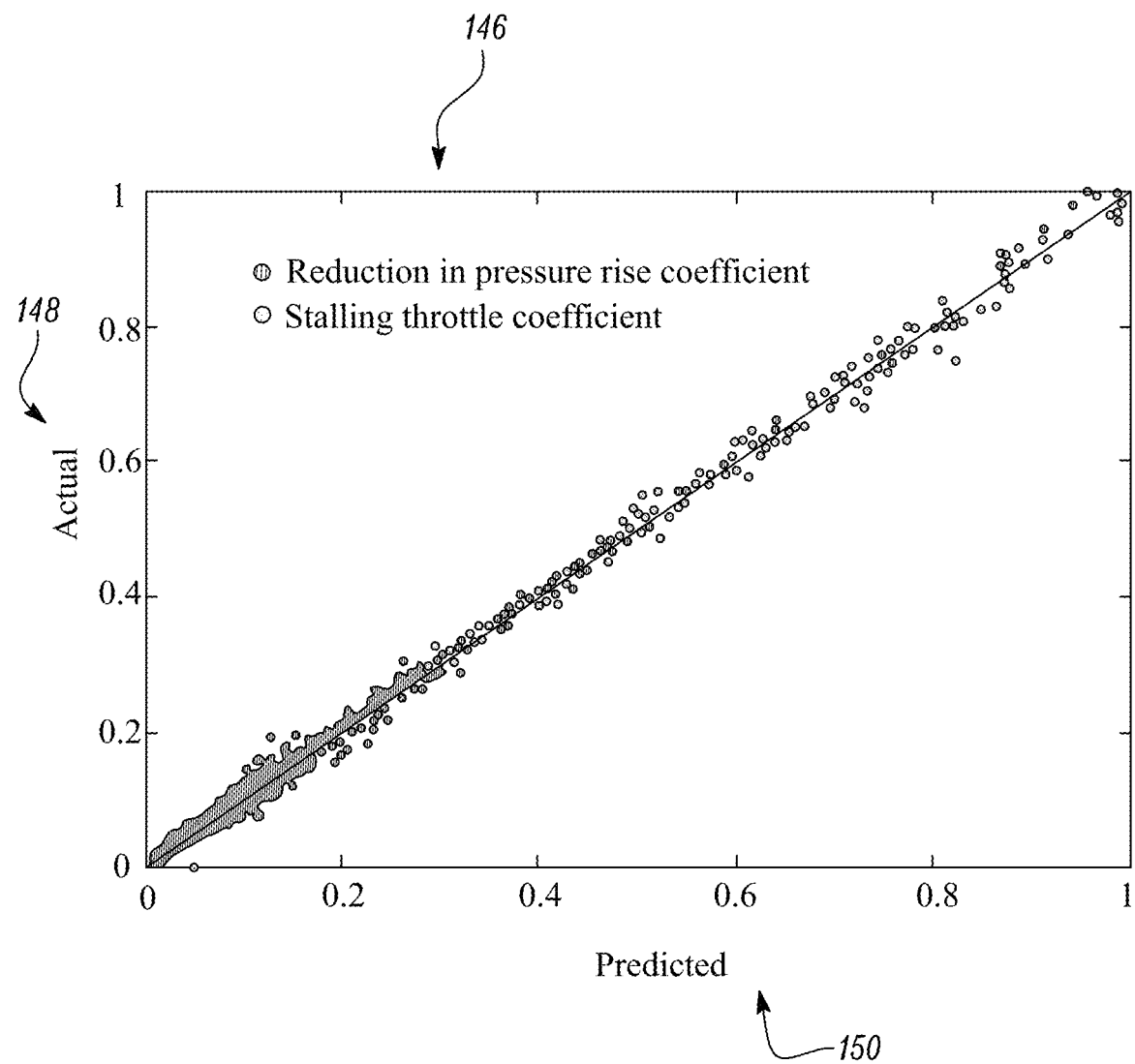
FIG. 11 illustrates a graph of sensed value versus predicted value for the reduction in pressure rise and for the stalling throttle coefficient.

The one or more trained machine learning algorithms may advantageously be more accurate at determining compressor operability than other methods. For example, FIG. 11 illustrates a graph 146 of sensed value versus predicted value for the reduction in pressure rise and for the stalling throttle coefficient according to the example described above. The graph 146 includes a vertical axis 148 for the sensed value and a horizontal axis 150 for the predicted value and illustrates the fits achieved with both artificial neural networks trained on 100% of the data. The data has been scaled between the actual observed maximum and minimum values in both cases.

The coefficient of determination $R^2$ for the stalling throttle coefficient artificial neural network was $R^2=0.990$ and for the pressure rise artificial neural network it was $R^2=0.997$. The unpredictable variance is lower in the case of the pressure rise artificial neural network compared to the stalling throttle coefficient artificial neural network, 0.3% of the variance is unpredictable compared to 1.0%.

Determination of Operability

Methods of determining operability of a compressor of a gas turbine engine are described in the following paragraphs with reference to FIG. 12.

At block 152, the method may include receiving data quantifying damage received by one or more compressor blades of a compressor. For example, the first controller 12 may receive data quantifying damage received by one or more compressor blades of the second compressor 56 of the gas turbine engine 20.

In some examples, the first controller 12 may receive image data of the second compressor 56 from the inspection device 24. The first controller 12 may then determine the damage received by one or more compressor blades of the second compressor 56 using the received image data. For example, the first controller 12 may use an image recognition algorithm on the received image data to identify and quantify damage received by the one or more compressor blades of the second compressor 56.

In other examples, the operator 26 may visually inspect the second compressor 56 using the inspection device 24 and record the damage received by the compressor blades using the user input device 14.

At block 154, the method may include generating data quantifying damage received by the compressor using the received data quantifying damage received by one or more compressor blades, and a damage parameter. For example, the first controller 12 may generate data quantifying damage received by the second compressor 56 by convoluting the data received at block 152 with a damage parameter. Block 154 may be repeated where it is desired to generate data quantifying damage from multiple different damage parameters.

Damage parameters are described in detail in the preceding paragraphs with reference to block 116 of FIG. 4 and shall consequently not be described in detail here. Briefly, the damage parameter used at block 154 may be an amount of damage to a portion of the second compressor 56, such as the amount of damage received by the compressor blades of the second compressor 56. By way of another example, the damage parameter used at block 154 may be one or more separations between portions of the first compressor 18 (for example, a separation between adjacent damaged portions of the second compressor 56, such as the separation between adjacent groups of damaged compressor blades of the second compressor 56). By way of a further example, the damage parameter used at block 154 may be a gradient of damage across at least a portion of the second compressor 56, such as the gradient of damage across a group of compressor blades of the second compressor 56. By way of another example, the damage parameter used at block 154 may be a number of damaged portions of the second compressor 56, such as the fraction of compressor blades of the second compressor 56 having damage within a percentage range.

At block 156, the method includes controlling input of the data quantifying damage received by the compressor of the gas turbine engine into a firs machine learning algorithm 33 that has been trained according to the methods illustrated in FIG. 4 and described herein. For example, the first controller 12 may control input of the data generated at block 154 into the first artificial neural network $33_1$.

At block 158, the method includes receiving data quantifying a first operating parameter of the compressor as an output of the first machine learning algorithm. For example, the first controller 12 may execute the first artificial neural network 33$_1$ stored in the first memory 30 and then receive data quantifying the stalling throttle coefficient of the second compressor 56 as an output of the first artificial neural network 33$_1$.

At block 160, the method includes determining operability of the compressor by comparing the received data quantifying the first operating parameter of the compressor with a threshold. For example, the first controller 12 may determine the operability of the second compressor 56 by comparing the data received at block 158 with a threshold stored in the first memory 30. The first controller 12 may control the display 16 to display the result of the operability determination, and/or may control storage of the operability determination in the first memory 30 (as data 161).

By way of an example, the first controller 12 may determine operability of the second compressor 56 by comparing the data quantifying the stalling throttle coefficient received at block 158 with a threshold stalling throttle coefficient. Where the stalling throttle coefficient received at block 158 is greater than a threshold stall point coefficient, the first controller 12 determines that the second compressor 56 is operable. Where the stalling throttle coefficient received at block 158 is equal to, or less than the threshold stalling throttle coefficient, the first controller 12 determines that the second compressor 56 is not operable.

Where the first memory 30 stores a plurality of machine learning algorithms, blocks 156, 158 and 160 may be performed for some, or all, of those machine learning algorithms to determine the operability of the second compressor 56.

For example, where the first memory 30 stores the second artificial neural network 33$_2$, block 156 may include controlling input of the data quantifying damage received by the compressor of the gas turbine engine into a second machine learning algorithm 33 trained according to the methods illustrated in FIG. 4 and described in the preceding paragraphs. For example, the first controller 12 may control input of the data generated at block 154 into the second artificial neural network 33$_2$.

At block 158, the method includes receiving data quantifying a second operating parameter of the compressor as an output of the second machine learning algorithm 33. For example, the first controller 12 may execute the second artificial neural network 33$_2$ stored in the first memory 30 and then receive data quantifying the pressure rise characteristic of the second compressor 56 as an output of the second artificial neural network 33$_2$.

At block 160, the method includes determining operability of the compressor by comparing the received data quantifying the second operating parameter of the compressor with a threshold. For example, the first controller 12 may determine operability of the second compressor 56 by comparing the data quantifying the pressure rise characteristic received at block 158 with a threshold pressure rise characteristic stored in the first memory 30. Where the pressure rise characteristic received at block 158 is greater than the threshold pressure rise characteristic, the first controller 12 determines that the second compressor 56 is operable. Where the pressure rise characteristic received at block 158 is equal to, or less than the threshold pressure rise characteristic, the first controller 12 determines that the second compressor 56 is not operable.

In some examples, the first controller 12 may determine that the second compressor 56 is not operable when block 160 returns an inoperable determination for only one operating parameter. For example, the second compressor 56 is determined to be inoperable when the stalling throttle coefficient received at block 158 is equal to, or less than the threshold stalling throttle coefficient, even if the pressure rise characteristic received at block 158 is greater than the threshold pressure rise characteristic.

In other examples, the first controller 12 may determine that the second compressor 56 is not operable only when block 160 returns an inoperable determination for two or more operating parameters. For example, the second compressor 56 is determined to be inoperable when the stalling throttle coefficient received at block 158 is equal to, or less than the threshold stalling throttle coefficient, and when the pressure rise characteristic received at block 158 is equal to, or less than then threshold pressure rise characteristic.

The methods illustrated in FIG. 12 and described above are advantageous in that they enable a determination of compressor operability to be made from an inspection of the compressor. Where the inspection device 26 enables 'on-wing' inspection (for example, where the inspection device 26 is a borescope), the determination of compressor operability made be made without removing the gas turbine engine from the aircraft. Furthermore, where the operation of the inspection device 26 is automated (for example, where the inspection device 26 is a continuum robot), the determination of compressor operability may be made with minimal or no human involvement.

Use of the Operability Determination

Methods of using an operability determination are described in the following paragraphs with reference to FIG. 13.

At block 162, the method includes receiving an operability determination for a compressor of a gas turbine engine. For example, the first controller 12 may receive the operability determination for the second compressor 56 of the gas turbine engine 20 by reading data 161 from the first memory 30. Alternatively, the first controller 12 may receive the operability determination for the second compressor 56 from another controller, separate to the first controller 12.

At block 164, the method includes determining one or more actions to be performed using the operability determination received at block 162. For example, the first controller 12 may determine that one or more of the following actions should be performed to increase the operational safety of the gas turbine engine 20 and/or to increase the time until the next service: control the rate of fuel deliverable to the combustor 68 of the gas turbine engine 20 to avoid fuelling spikes and to limit slam accelerations; control the operational state of one or more bleed valves of the second compressor 56; control the orientation of one or more stators of the second compressor 56.

To assist in the determination at block 164, the first controller 12 may perform one or more of following: calculate the surge margin of the second compressor 56 and compare the calculated surge margin with a surge margin of a gas turbine engine having an undamaged compressor; calculate the efficiency of the gas turbine engine 20; determine engine operating parameters or a safety margin of the gas turbine engine 20; determine engine performance of the gas turbine engine 20.

At block 166, the method includes generating control data using the determined one or more actions. For example, the first controller 12 may generate any of the following control data using the one or more actions determined at block 164:

control data that defines a maximum rate of fuel deliverable to the combustor 68 of the gas turbine engine 20; control data that defines an operational state (open or closed for example) of one or more bleed valves of the second compressor 56; control data that defines an orientation for one or more stators of the second compressor 56.

The generated control data may define repair instructions for execution by a robotic repair tool. In this example, the first controller 12 may transmit the control data to a controller of the robotic repair tool to enable the robotic repair tool to perform the repair instructions (for example, laser deposition of material to repair a damaged compressor blade). Alternatively, the first controller 12 may use the control data to directly control the robotic machine tool to perform the machining instructions.

At block 168, the method may include controlling storage of the control data in a memory to update (or add) one or more gas turbine engine operating parameters. For example, the first controller 12 may transmit the control data to the second controller 22. The second controller 22 may subsequently update (or add) one or more of the gas turbine engine operating parameters 93 using the control data.

At block 170, the method may include controlling a component of the gas turbine engine using the generated control data. For example, the second controller 22 may control a component (such as a fuel pump, a bleed valve, or a stator) of the gas turbine engine 20 during flight using one of the gas turbine engine operating parameters 93 that was updated at block 168 to avoid compressor surge.

In addition to, or as an alternative to blocks 164, 166, 168 and 170, the method may move to block 172 from block 162.

At block 172, the method may include selecting a repair scheme for the compressor using the received operability determination. For example, the first controller 12 may use the operability determination received at block 162 to select a repair scheme to reduce the likelihood of surge in the second compressor 56. For example, the first controller 12 may select a repair scheme to restore material to one or more compressor blades of the second compressor 56 and schedule the repair for when the aircraft carrying the gas turbine engine 20 is at an airport having that repair facility.

The methods illustrated in FIG. 13 and described in the preceding paragraphs may advantageously enable safer operation of the gas turbine engine 20 and may increase the time until the next service. Additionally, the methods may enable optimal selection and scheduling of a repair.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

In some examples, blocks 116 and 154 may alternatively comprise generating data quantifying damage received by the first compressor 18 and the second compressor 56 by applying an algorithm (for example consisting of one or more Fourier-related transforms such as a Hadamard transform) to the received data quantifying damage received by the one or more compressor blades.

In other examples, the apparatus 10 may be configured to enable one or more machine learning algorithms to be trained for any rotor of a gas turbine engine (such as a fan rotor or a turbine rotor). For example, a training data set may be generated for damage received by turbine blades of a turbine rotor, and one or more operating parameters that are affected by the damage. The one or more machine learning algorithms may then be used to determine the operability of that rotor of the gas turbine engine 20. The apparatus 10 may also be configured to control the operation of the gas turbine engine 20 using the determined operability of that rotor, and/or schedule a repair of the rotor.

In further examples, the apparatus 10 may be configured to enable one or more machine learning algorithms to be trained for any one or more components of a gas turbine engine (including static components such as a liner in the primary air system). For example, a training data set may be generated for damage received by one or more components of a gas turbine engine, and one or more operating parameters that are affected by the damage. The one or more machine learning algorithms may then be used to determine the operability of the gas turbine engine 20. The apparatus 10 may also be configured to control the operation of the gas turbine engine 20 using the determined operability, and/or schedule a repair of the rotor.

It should be appreciated that the methods described in the preceding paragraphs may be used for any compression based propulsion system. For example, components to be assessed for damage may include a propeller, a fan, a turbocharger, a ship propeller or a water jet (also known as a 'pump-jet' and a 'hydrojet').

Except where mutually exclusive, any of the features may be employed separately or in combination with any other features and the disclosure extends to and includes all combinations and sub-combinations of one or more features described herein.

We claim:

1. A computer-implemented method comprising:
controlling input of data quantifying damage received by a compressor of a gas turbine engine into a first machine learning algorithm, the data quantifying damage being generated using a damage parameter selected from one of the following: an amount of damage to a portion of the compressor, one or more separations between portions of the compressor, a gradient of damage across at least the portion of the compressor, and a number of damaged portions of the compressor;
receiving data quantifying a first operating parameter of the compressor as an output of the first machine learning algorithm, wherein the data quantifying the first operating parameter of the first compressor is indicative of operation of the compressor and is a different type of data from the data input into the first machine learning algorithm, and the first operating parameter is a stalling throttle coefficient;
determining operability of the compressor by comparing the received data quantifying the first operating parameter of the compressor with a threshold;
generating control data based on one or more actions to be performed to increase operational safety of the gas turbine engine, wherein the one or more actions are determined based on the determined operability of the compressor; and
performing, as the one or more actions, one or more of the following: controlling the rate of fuel deliverable to a combustor of the gas turbine engine so as to avoid fuelling spikes and to limit slam accelerations, controlling an operational state of one or more bleed valves of the compressor of the gas turbine engine, and controlling the orientation of one or more stators of the compressor.

2. The computer-implemented method as claimed in claim 1, further comprising:

receiving data quantifying damage received by one or more compressor blades of the compressor; and generating the data quantifying the damage received by the compressor using the received data quantifying the damage received by the one or more compressor blades, and the damage parameter.

3. The computer-implemented method as claimed in claim 2, wherein the step of receiving the data quantifying the damage received by the one or more compressor blades of the compressor comprises:

receiving image data of the compressor; and determining the damage received by the one or more compressor blades of the compressor using the received image data.

4. The computer-implemented method as claimed in claim 2, wherein the generating of the data quantifying the damage received by the compressor comprises convoluting the received data quantifying the damage received by the one or more compressor blades of the compressor with the damage parameter.

5. The computer-implemented method as claimed in claim 2, wherein the generating of the data quantifying the damage received by the compressor comprises using the received data quantifying the damage received by the one or more compressor blades, and a plurality of the damage parameters.

6. The computer-implemented method as claimed in claim 5, wherein the generating of the data quantifying the damage received by the compressor comprises convoluting the received data quantifying the damage received by the one or more compressor blades of the compressor with each damage parameter of the plurality of damage parameters.

7. The computer-implemented method as claimed in claim 2, wherein the generating of the data quantifying the damage received by the compressor comprises providing the received data quantifying the damage received by the one or more compressor blades of the compressor as an input to another algorithm.

8. The computer-implemented method as claimed in claim 7, wherein the other algorithm comprises one or more Fourier-related transforms.

9. The computer-implemented method as claimed in claim 8, wherein the one or more Fourier-related transforms comprise a Hadamard transform.

10. The computer-implemented method as claimed in claim 1, further comprising:

controlling input of the data quantifying the damage received by the compressor of the gas turbine engine into a second machine learning algorithm;

receiving data quantifying a second operating parameter of the compressor as an output of the second machine learning algorithm; and determining the operability of the compressor by comparing the received data quantifying the second operating parameter of the compressor with another threshold.

11. The computer-implemented method as claimed in claim 10, wherein the second operating parameter is a pressure rise characteristic.

12. A non-transitory computer readable storage medium comprising computer readable instructions that, when read by a computer, cause performance of the computer-implemented method as claimed in claim 1.

13. An apparatus comprising: a controller configured to perform the computer-implemented method of claim 1.

* * * * *